(12) United States Patent
Hinderling

(10) Patent No.: US 11,035,935 B2
(45) Date of Patent: Jun. 15, 2021

(54) OPTOELECTRONIC SURVEYING DEVICE

(71) Applicant: HEXAGON TECHNOLOGY CENTER GMBH, Heerbrugg (CH)

(72) Inventor: Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 337 days.

(21) Appl. No.: 15/342,107

(22) Filed: Nov. 2, 2016

(65) Prior Publication Data

US 2017/0123052 A1 May 4, 2017

(30) Foreign Application Priority Data

Nov. 3, 2015 (EP) .................................... 15192822
Jul. 15, 2016 (EP) .................................... 16179816

(51) Int. Cl.
| | |
|---|---|
| *G01C 3/08* | (2006.01) |
| *G01S 7/481* | (2006.01) |
| *G01C 15/00* | (2006.01) |
| *G01S 17/66* | (2006.01) |
| *G01S 17/42* | (2006.01) |
| *G01S 7/48* | (2006.01) |
| *G01S 17/08* | (2006.01) |

(52) U.S. Cl.
CPC .............. *G01S 7/4812* (2013.01); *G01C 3/08* (2013.01); *G01C 15/002* (2013.01); *G01S 7/4802* (2013.01); *G01S 7/4814* (2013.01); *G01S 17/08* (2013.01); *G01S 17/42* (2013.01); *G01S 17/66* (2013.01)

(58) Field of Classification Search
CPC .... G01S 7/4812; G01S 7/4802; G01S 7/4814; G01S 17/08; G01S 17/42; G01S 17/66; G01C 3/08; G01C 15/002
See application file for complete search history.

(56) References Cited

U.S. PATENT DOCUMENTS 5,682,229 A * 10/1997 Wangler ................. G01S 17/89
356/4.01
5,949,531 A 9/1999 Ehbets et al.
7,583,373 B2 9/2009 Schwarz
(Continued)

FOREIGN PATENT DOCUMENTS

| CN | 1900805 A | 1/2007 |
|---|---|---|
| CN | 103201590 A | 7/2013 |

(Continued)

OTHER PUBLICATIONS

European Search Report dated Jun. 27, 2017 as received in Application No. 16179816.0.
(Continued)

*Primary Examiner* — Samantha K Abraham
(74) *Attorney, Agent, or Firm* — Maschoff Brennan

(57) ABSTRACT

Optoelectronic surveying device for distance and/or position determination comprising a radiation source for generating optical measurement radiation of a first wavelength, wherein the measurement radiation is emitted in an oriented manner into free space. The radiation source is designed such that the first wavelength is in the range between 1210 nm and 1400 nm and the power of the emitted measurement radiation is at least 14 mW in the chronological and spatial average.

21 Claims, 8 Drawing Sheets

(56) References Cited

U.S. PATENT DOCUMENTS

| | | | |
|---|---|---|---|
| 8,031,331 B2 | 10/2011 | Meier et al. | |
| 8,797,512 B2 | 8/2014 | Stettner et al. | |
| 2001/0048519 A1* | 12/2001 | Bamji | G01C 3/04 356/5.1 |
| 2004/0169837 A1* | 9/2004 | Pril | G03F 7/70775 355/71 |
| 2012/0262550 A1* | 10/2012 | Bridges | G01S 7/491 348/46 |
| 2013/0314693 A1 | 11/2013 | Skidmore et al. | |
| 2013/0326892 A1 | 12/2013 | Schorr | |
| 2014/0118718 A1 | 5/2014 | Jungwirth | |
| 2014/0241596 A1* | 8/2014 | Chen | G06K 9/00885 382/124 |
| 2015/0043009 A1 | 2/2015 | Bridges et al. | |
| 2015/0109603 A1* | 4/2015 | Kim | G01S 7/4815 356/4.07 |
| 2016/0377722 A1* | 12/2016 | Lardin | G01S 7/4817 356/5.09 |

FOREIGN PATENT DOCUMENTS

| | | |
|---|---|---|
| CN | 103502841 A | 1/2014 |
| CN | 103792540 A | 5/2014 |
| EP | 0 701 702 B1 | 2/1997 |
| EP | 0 738 899 B1 | 3/2000 |
| EP | 1 686 350 A1 | 8/2006 |
| EP | 1 869 397 B1 | 5/2013 |
| WO | 2007/079600 A1 | 7/2007 |
| WO | 2012/153309 A1 | 11/2012 |
| WO | 2015/073548 A2 | 5/2015 |

OTHER PUBLICATIONS

Newbury, N.R., et al.,"Frequency-Comb Based Approaches to Precision Ranging Laser Radar", Coherent Laser Radar Conference XVI, Jun. 2011, pp. 4.

European Search Report for corresponding European Application No. 15 19 2822, dated Apr. 28, 2016.

Characteristics and impact factors of ocular damage effects induced by transitional near-infrared laser: a review, Wang Jia Rui, Military Medical Sciences, vol. 39, No. 9, Sep. 2015, pp. 717-720 and 724.

Engllish Translation of CN Office Action in Application No. 201610957522.0 dated Apr. 24, 2020.

Infrared Radiation and Application, Wang Haiyan, Xidian Univ. Press, Aug. 31, 2014, pp. 56-57 (See accompanying concise explanation).

Principles and Applications of Remote Sensing (Third Edition), Sun Jiabin, Wuhan Univ. Press, Jun. 30, 2013, pages (See accompanying concise explanation).

* cited by examiner

OPTOELECTRONIC SURVEYING DEVICE

FIELD OF THE INVENTION

The invention relates to an optoelectronic surveying device and an optoelectronic measuring method.

BACKGROUND

Optoelectronic surveying devices, using which a distance and/or position is determined based on optical radiation, are known in manifold forms. Examples are geodetic surveying devices such as electronic tachymeters, total stations, multistations, or laser scanners for geodetic or industrial surveying purposes, laser trackers, or handheld electronic distance meters or direction meters. These devices share the feature that they comprise at least one radiation source for generating measurement radiation and optical means such as lenses, light conducting fibers, or collimators, by means of which the generated measurement radiation can be emitted into free space toward a target to be surveyed, because of which these devices are also referred to as so-called free beam sensors. The target to be surveyed is, for example, a point of a surface of a natural object or a target designed especially for surveying purposes, for example, a retroreflector. The irradiated target reflects measurement radiation in a diffuse or oriented manner, so that at least a part of the measurement radiation is reflected onto the surveying device. The surveying device has an optoelectronic sensor, which is designed for the time-resolved and/or location-resolved detection of the measurement radiation, for example, a PIN diode, a CMOS chip, or a position-sensitive detector (PSD). The desired measurement variable, for example, a distance value or directional value or a 2D/3D coordinate, is determined on the basis of the detected measurement radiation. Various measurement principles are available in this case, for example, phase difference measurement or runtime measurement (time-of-flight, TOF), or measurement based on the Fizeau principle.

Optical measurement radiation is understood in this case as electromagnetic radiation not only in the visible range of the spectrum, but rather also infrared light, i.e., radiation having a wavelength greater than approximately 700 nm. Optoelectronic surveying devices are known which use measurement radiation having a wavelength of 405 nm, 532 nm, 635 nm, 650-690 nm, 780 nm and/or 785 nm, 795 nm, 808-850 nm, 905 nm, 1064 nm, or 1545 nm and/or 1550 nm. For example, the following wavelengths are used in the devices of the producer Leica Geosystems: total stations TPS1200+660 nm and 785 nm, total station TCA2003 850 nm, laser scanner HDS3000 532 nm, laser scanner HDS4400 905 nm, laser scanner HDS8800 1545 nm, distance meter Disto D5 635 nm, laser tracker AT401 795 nm, and airborne laser scanner ALS80 1064 nm.

The quality of the measurement result and/or the quality of the determination of the desired measurement variable is substantially dependent on the signal-to-noise ratio (SNR). This is in turn decisively dependent on the detected radiant power. A high detected radiant power is advantageous to be able to delimit the measurement radiation unambiguously and sharply from the noise and/or from the background radiation. In this case, the detected radiant power (with otherwise uniform conditions) is higher the higher the emitted radiant power. The ratio of emitted radiant power $P_e$ and detected radiant power $P_r$ can be described in this case by the so-called radar range equation (cf. Jelalian, A. V.: Laser Radar Systems. Artech House, 1992, page 6):

$$P_r = \frac{\pi \rho D^2}{(4R)^2} P_e \eta_{atm} \eta_{sys}$$

where $\rho$: reflection coefficient of the target, D: diameter of the aperture opening and/or detecting lens of the surveying device; R: distance to the target, $\eta_{atm}$: atmospheric transmission coefficient, and $\eta_{sys}$: transmission coefficient of the surveying device and/or the detection optical unit thereof.

The equation illustrates the fact that only a small fraction of the emitted radiant power is received again, i.e., a majority of the emitted radiation is "lost" unused. Since the distance to the target is included as its square in the equation, the maximum achievable measurement range is dependent to a high degree on the emitted power of the measurement radiation and/or energy of the radiation source. High radiant powers are thus advantageous especially for the measurement in relation to a very remote target. Surveying devices of the prior art have comparatively low mean radiant powers, however, in the range of less than one milliwatt to several milliwatts, for example, the power in the case of the total station TCR1103 from Leica Geosystems is 0.95 mW and it is also less than 1 mW in the case of the distance meter Disto D5 from Leica Geosystems.

By way of suitable modulation of the emitter using the shortest possible pulses, i.e., using duty cycles substantially less than 1:100, the attempt is made to increase the sensitivity and therefore the measurement range. In this case, the pulse power inversely to the duty cycle is higher than the mean radiant power. The pulse detection and the signal-to-noise ratio are accordingly improved in this case, nonetheless, long ranges and/or targets at great distance are not measurable or are only measurable inadequately or imprecisely.

However, a high radiant power is also important for surveying targets having low reflectivity and/or small reflection coefficients, as many natural surfaces have. Natural targets are also to be understood in this case as man-made structures such as concrete, asphalt, or metal. However, even upon the use of non-natural, cooperative targets such as reflective films, planar reflectors (catseyes), or retroreflectors, i.e., targets which are designed especially for surveying purposes and reflect radiation in an oriented and/or bundled manner, a high power is advantageous, because the reflection surface thereof (for example, approximately 0.001 m²) is small, above all at long distance to the target, in relation to the area of the measurement radiation cross section, so that also in this case, in practice only a fraction of the emitted radiation is reflected. It is also to be taken into consideration that as a result of the geometric limits of the receiver optical unit, the entire reflected measurement radiation generally cannot be detected, but rather a majority is incident outside the aperture and/or reception optical unit on the surveying device.

For the mentioned reasons, with regard to the achievable precision and range, the highest possible power of the measurement radiation is desirable and/or a low power of the measurement radiation is disadvantageous with respect to achievable precision and/or measurement range.

The radar range equation also refers to the degree of reflection or backscattering of the natural object surface to be surveyed. The higher the reflectance, the higher the reception signal. The reflectance is an object-specific spectral signature function having pronounced wavelength dependence. Therefore, a wavelength is advantageously to be selected for the measurement radiation of a measurement instrument, at which the target objects provided for the measurement instrument have high reflectance.

In addition, measurement radiation which is attenuated as little as possible during the passage through free space and/or the atmosphere is advantageous, which is expressed in the above equation in a high atmospheric transmission coefficient. Because the transmission is wavelength-dependent, measurement radiation of a wavelength which is attenuated relatively strongly is disadvantageous, because the power of the received measurement radiation and therefore the level of the reception signal is thus low, particularly at longer measurement distances, in spite of a high power of the emitted measurement radiation.

On the other hand, an elevated noise has a negative effect on the signal-to-noise ratio and therefore on the measurement result. Elevated and/or high noise occurs above all in the case of outdoor measurements primarily due to solar radiation, which is incident directly or as ambient light diffusely on the receiving optical unit and then on the sensor of the surveying device. In particular in the case of targeting and measuring bright surfaces, such as white house façades, the background radiation is substantial, the shot noise level in the receiving unit increases and reduces the signal-to-noise ratio and therefore the measurement accuracy. The least possible reception of ambient radiation and/or external radiation is thus advantageous with respect to the quality of the measurement result and/or the quality of the determination of the desired measurement variable.

With respect to the described (interfering) factors, the surveying devices known from the prior art and/or the emitted wavelengths of the radiation sources thereof have disadvantages, which relate above all to the ratio of detected radiant power to emitted radiant power, and are described in detail hereafter.

SUMMARY

Some embodiments of the present invention therefore provide an improved optoelectronic surveying device for distance and/or position measurement.

The invention relates to an optoelectronic surveying device for distance and/or position determination comprising at least one radiation source for generating optical measurement radiation of a first wavelength. The surveying device furthermore comprises an optoelectronic sensor for the location-resolved and/or time-resolved detection of measurement radiation. In addition, the surveying device comprises optical means, for example lenses, prisms, collimators, mirrors, and/or optical fibers, which are designed for optical beam guiding such that the generated measurement radiation can be emitted into free space toward a target to be surveyed and measurement radiation reflected by the target is guided at least partially onto the sensor. According to the invention, the radiation source is designed such that the first wavelength is in the near infrared range between 1210 nm and 1400 nm. In addition, the radiation source is designed such that the power of the emitted measurement radiation is at least 14 mW in the chronological and spatial average.

The wavelength range used in the present invention is selected intentionally such that an array of advantages are linked thereto, particularly with respect to the detectable radiant power and the signal-to-noise ratio, which is described hereafter in conjunction with FIGS. 1-10. In this case, the present invention offers the advantage of a high receivable measurement radiant power in comparison to devices of the prior art, which enables improved measurement accuracy and/or measurement range and/or a uniform measurement accuracy and/or measurement range with reduced requirements and therefore production costs for the surveying device, for example, with respect to a measurement signal analysis as a result of an improved signal-to-noise ratio.

The first wavelength is optionally between 1280 nm and 1320 nm, in particular between 1290 nm and 1310 nm. These ranges are, as described hereafter, particularly advantageous for surveying devices which are designed for long measurement ranges. Alternatively, the first wavelength is between 1320 nm and 1400 nm, in particular between 1325 nm and 1345 nm.

Optionally, the measurement radiation is emitted at a mean power of at least 40 mW, in particular at least 100 mW, especially at least 250 mW. The radiation source is preferably designed to generate measurement radiation having a signal modulation. In this case, inter alia, modulation forms as are known from telecommunications are used. Examples of a signal modulation according to the invention are burst modulation or frequency modulation.

In a special refinement of the surveying device according to the invention, the radiation source is designed to generate measurement radiation as a continuous wave, i.e., to generate non-pulsed radiation. In this case, continuous wave radiation is understood as a measurement radiation which is continuously emitted over at least a period of time of 0.4 ms. The mean power of the emitted measurement radiation is accordingly understood as the power averaged over at least this period of time (i.e., 400 µs).

In general, i.e., independently of the existence of continuous wave operation, mean power is understood in the scope of the present invention as the power which is or would be measured using a "slow" power meter, which thus, for example, in the case of a surveying device having pulsed measurement radiation, cannot follow a pulse duration or pulse sequence and therefore does not have time resolution. That is to say, the power of a single pulse or the peak pulse has to be very much higher depending on the pulse duration or pulse sequence to compensate for the powerless idle times and thus reach the minimum power of at least 14 mW on average. The chronological averaging is performed in this case, for example, over at least 0.25 s, 1 s, or 10 s.

For surveying devices, in particular laser scanners and laser profilers, which do not perform single point measurements having fundamentally static emission direction of the measurement radiation (no "point-to-point measurements"), but rather emit the measurement radiation rapidly pivoting in free space (so rapidly that the movement thereof cannot be followed using the power meter), this means that according to the invention, the power which the radiation source directly emits is very much higher than the mean of 14 mW, so that the power of the emitted measurement radiation is at least 14 mW on average as defined in the invention, similarly to the power of the radiation source upon emission of a single pulse of a pulse sequence, which is also very much higher than 14 mW. In other words, in such surveying devices, the power is spatially distributed, the nominal power of the radiation source or the measurement beam is to be considered to be distributed on a circular or ring-shaped surface (upon pivoting about an axis), so that the fraction of this nominal power which corresponds to the fraction of a surface element of this ring surface is to be considered the power in the meaning of the present invention. (One could also say that in such a surveying device in the understanding of the present invention, a measurement beam having a divergence which corresponds to the scanning angle, for example, 360°, is provided.) Therefore, in the case of such scanning devices, which measure in a planar manner, the power of the measurement radiation, which would be measured with uniform emission direction, i.e., for example, with a measurement beam continuously aligned on the power meter—which is to be understood as a spatial peak power, is not relevant according to the invention, but rather the power using a rapidly rotating measurement beam (as in the actual measurement operation), which is or would be measured by the "slow" power meter positioned at a fixed location (i.e., not following the pivot movement).

In other words, according to the invention, the optical output or peak power of the radiation source is thus not relevant, but rather the power which is or would be receivable or measurable on average at a fixed location in relation to the surveying device over an above-mentioned minimum duration. That is to say, power of the emitted measurement radiation in the chronological and spatial average means according to the invention neither the chronological nor the spatial peak power, but rather the power which corresponds to the chronological and spatial average (wherein it is to be noted that a spatial averaging in the meaning of the present invention does not relate to a possible spatial power distribution within the measurement beam itself, but rather relates to a possible rapid pivoting of the measurement beam in space). Only in the case of continuous wave operation without pivoting is the value of this average simply equal to the radiant power and/or radiation source output power, in the case of continuous wave operation with pivoting, in contrast, spatial averaging is to be performed (chronological averaging according to the invention is not necessary, because the power is chronologically constant, and is therefore omitted), in the case of pulsed operation without (rapid) pivoting, only chronological averaging is to be performed (spatial averaging according to the invention is not necessary, because no pivoting of the measurement beam in space occurs, and is therefore omitted), and in the case of pulsed operation with pivoting, both chronological and also spatial averaging are to be performed. In the case of pulsed operation, in order to ascertain the power in the meaning of the invention, the power of the individual pulses is thus to be uniformly distributed or "smeared" over the chronological averaging period of time, thus as if a uniform power were provided at each point in time (power as the total of the energy of all pulses within the overall period of time). Similarly, in the case of pivoting operation of a laser scanner or laser profile, the power of the individual measurement beam is to be "smeared" uniformly over the area, thus as if equal power were present at a specific point in time at each point of the area or each area element. In the case of pulsed operation combined with pivot operation, both are required to obtain the power on average in the meaning of the invention.

The radiation source is optionally designed as a laser source, in particular a laser diode, especially as an InGaAs or InGaAsP laser diode. Alternatively, the radiation source is designed as a super-luminescent diode (SLED) having optical amplifier. As a further alternative, the radiation source can be designed as a solid-state laser, in particular as a Nd:YVO4 crystal laser having a wavelength of 1342 nm.

In one refinement of the surveying device according to the invention, the optical means are designed such that the measurement radiation is emitted as a decollimated measurement beam, i.e., is emitted as non-collimated, divergent measurement radiation. Optionally, the measurement radiation is pivotable on the basis of the optical means about at least one axis, for example, by way of a pivoting mirror or a rotatable prism. As a further option, the surveying device has a shared objective lens for emitting the measurement radiation and for receiving measurement radiation reflected from the target. As a further option, the optical means are also transmissive to light in the visible range of the optical spectrum, i.e., the optical means are designed not only for guiding measurement radiation of the wavelength according to the invention, but rather are also capable of guiding further radiation having a wavelength in the visible range. The optical means are preferably substantially manufactured from optical glasses, in particular silicate glass, e.g., borosilicate crown glass, flint glass, or optical plastics such as polycarbonate (PC) or Plexiglas (PMMA), wherein the use of cycloolefinic copolymers (COC, COP) is also conceivable.

As a further alternative, the surveying device comprises an optical frequency converter, in particular a frequency doubler, whereby a component of at most 25%, in particular at most 10%, especially at most 2.5% of the measurement radiation is convertible into a second wavelength, which is less, in particular half as long as the first wavelength, so that, preferably simultaneously, additional radiation of the second wavelength can be emitted, in particular wherein the second wavelength is in the red spectral range, especially between 645 nm and 680 nm. Especially in such embodiments, as mentioned, the optical means are also designed for guiding visible radiation.

The surveying device is optionally designed for surveying natural, non-cooperative targets and surfaces. As a further option, the sensor is designed for measurement accuracies in the submillimeter and/or subpicosecond range. In a further refinement, the surveying device comprises an upper part pivotable about a base, wherein the upper part comprises the radiation source, so that thus by pivoting the upper part, the direction of the measurement radiation is pivotable in relation to the base, in particular in the horizontal.

In optional embodiments, the surveying device is designed in each case as a handheld laser distance meter, airborne laser scanner or laser profiler (lidar), terrestrial laser scanner (TLS) or laser profiler of moderate or long range, or laser total station (TPS).

In a further refinement, the surveying device comprises a waveform digitizing module or a frequency-modulated continuous wave module. The surveying device optionally furthermore comprises an optical mixer, which is designed to carry out a homodyne or heterodyne mixing method.

The present invention additionally relates to an optoelectronic measurement method for an optoelectronic surveying device for determining at least one distance and/or position. The measurement method includes the following steps:

emitting the measurement radiation toward a target to be surveyed,
    receiving at least a part of the measurement radiation reflected from the target,
    determining the distance and/or position by means of the received measurement radiation, wherein the measurement radiation is emitted at a first wavelength in the near infrared range between 1210 nm and 1400 nm and a mean power of at least 14 mW is emitted. The first wavelength is optionally in the range between 1280 nm and 1320 nm, especially between 1290 nm and 1310 nm. Alternatively, the first wavelength is in the range between 1320 nm and 1400 nm, especially between 1335 nm and 1345 nm. As a further option, the measurement radiation is emitted at a power of on average at least 40 mW, especially at least 100 mW.

In one refinement of the measurement method according to the invention, the determination of the distance is performed according to the waveform digitizing method, the phase difference method, the threshold value method, or the Fizeau method. Alternatively or additionally, the determination of the position is performed according to focal point analysis, correlation analysis, or maximum likelihood estimation methods. The present invention enables, as a result of the selected wavelength and the comparatively high power of the measurement radiation, the use of the phase difference method and also the threshold value method in areas of application in which this is not possible using methods and/or devices of the prior art. For example, the detected reflected measurement radiation is too low using known surveying devices in the case of measurements for very remote targets, i.e., long measurement ranges, or on weakly reflective targets, to be able to use the phase difference method or the threshold value method. In particular also in the case of the use of the phase difference method, the present invention offers the advantages of increased range, more rapid measurement rate, and more precise measurement, also on comparatively dark targets. Using a summation, which is implemented by a heterodyne method, of very many pulses, the phase difference method enables very high precision (very low distance jitter of less than 100 μm). If the threshold value method is used, the present invention offers further cost advantages, because the threshold value method is a comparatively cost-effective measurement method. In addition, these methods, for example, in contrast to pulse averaging, which results in contour or edge smearing, offer advantages in the resolution of the position in the case of scanning measurement, during which the measurement radiation is pivoted very rapidly.

As a further option, the measurement radiation is modulated by means of pulse modulation, interval modulation, double pulse interval modulation, amplitude modulation, frequency modulation, burst modulation, polarization modulation, or wavelength modulation.

As a further option, the measurement radiation comprises at least two wavelengths and a signal amplitude of the received measurement radiation is determined for each wavelength. The measurement radiation is thus emitted in this refinement of the method according to the invention not only in one wavelength, but rather with at least two wavelengths, wherein at least one, preferably all of the wavelengths are in the range between 1210 nm and 1400 nm according to the invention. In addition, the received measurement radiation is analyzed with respect to the amplitude thereof, so that an intensity is ascertained for the at least two wavelengths. The measurement radiation preferably has a plurality of wavelengths, for example, 10, 50, 100, or 250 different wavelengths or spectral bands, which preferably are located close to one another, and a hyperspectral intensity measurement is performed. Therefore, for example, a spectral signature of an object to be surveyed is determinable using the method according to the invention.

The present invention furthermore includes a computer program product or computer data signal, embodied by an electromagnetic wave, having program code for controlling and/or carrying out the method according to the invention, in particular when the program is executed in a control and analysis unit of a surveying device according to the invention.

The surveying device according to the invention and the method according to the invention are described in greater detail hereafter on the basis of the embodiments and application procedures which are schematically illustrated in the drawings.

DETAILED DESCRIPTION

Figure 1:
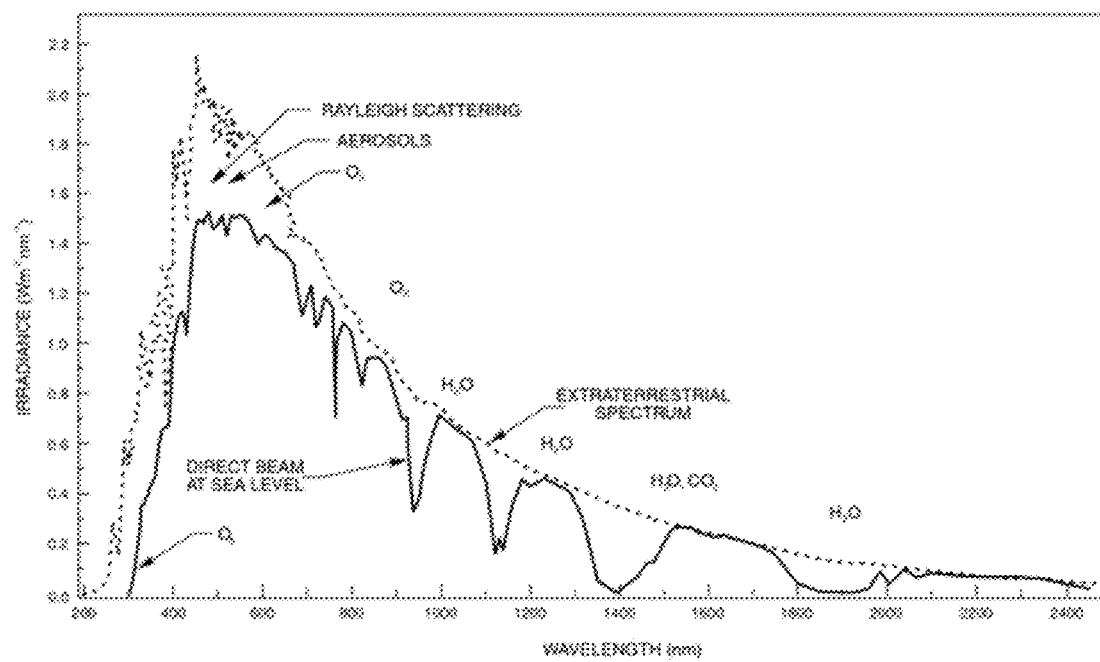
FIG. 1 shows a solar spectrum on the earth having atmospheric absorption bands as a function of the wavelength.

FIG. 1 shows the solar global radiation which is incident on the earth (at sea level) as a function of the wavelength. The maximum of the global radiation is in the visible range of the radiation spectrum and drops toward the near infrared range. That is to say, for outdoor measurements, measurement radiation having wavelengths in the near infrared range from approximately a wavelength of 1150 nm is less by a factor of at least three than at 550 nm. In addition, an atmospheric window having high optical transmission is located between 1150 nm and 1350 nm. According to the invention, the radiation sources in this spectral range are substantially more advantageous than measurement radiation in the visible range, for example, using the known wavelengths 532 nm, 635 nm, but also the range adjoining thereon of the IR spectrum, for example, 1064 nm, because in this range the interfering influence of natural external radiation and/or background radiation is substantially less. The global radiation is particularly low in particular in the wavelength range of 1320 nm to 1400 nm. The reason for this is the high radiation absorption of the water and carbon dioxide molecules in the air. Such absorption bands shield the solar radiation, but have the disadvantage that the useful light of optoelectronic surveying devices is also strongly reduced, at least at distances greater than 100 m. At short distances up to several tens of meters, in contrast, the signal attenuation is insignificant and, with sufficiently greater emission power, a substantially better signal-to-noise ratio results than in the visible and the near infrared ranges. The wavelength range 1320-1400 nm is therefore advantageous for optoelectronic short-distance sensors. For long-distance sensors such as laser theodolites and geodetic total stations, in contrast, the wavelength range of the atmospheric window between 1170-1310 nm is advantageous. This range is distinguished by a low solar global radiation and a high spectral transmission of the atmosphere. Therefore, a substantially better signal-to-noise ratio is achievable by the present invention with regard to the background radiation, and therefore a greater measurement accuracy, higher measurement speed, and/or measurement range, without additional expenditure, for example, in the signal analysis, than in surveying devices according to the prior art.

Figure 2:
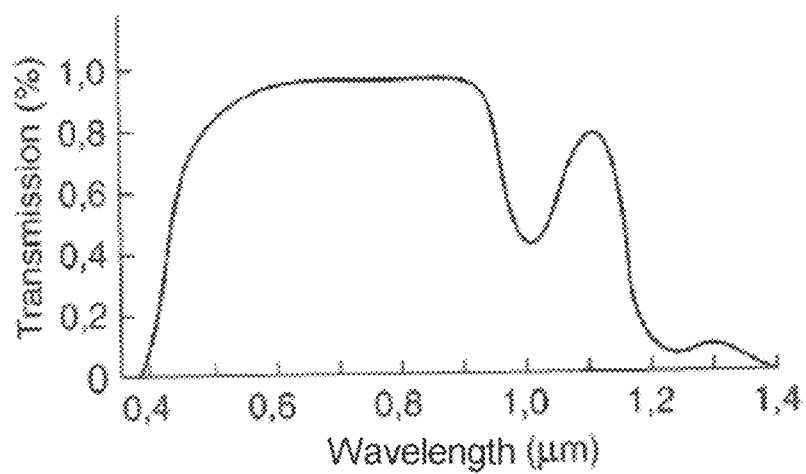
FIG. 2 shows a degree of spectral transmission of the human eye from the lens up to the retina as a function of the wavelength.

FIG. 2 shows the transmissivity (transmittance) of the human eye up to the retina as a function of the wavelength for the wavelength range from 350 nm to 1400 nm. This substantially corresponds at the longwave end of the spectrum shown to the transmission behavior of approximately 2 cm of water. From a wavelength of 1150 nm, the transmittance decreases rapidly and is less than approximately 10% between 1320 nm and 1400 nm. That is to say, for wavelengths in this range, the risk of damage to the human eye by the measurement radiation is very low. In contrast thereto, measurement radiation of a lower wavelength, especially in the visible range, but also the wavelength 1064 nm, for example, has a substantially higher risk potential, so that the measurement radiation can only be emitted at very low power of, for example, 1 mW, to be considered to be eye safe. Measurement radiation in the UV range, in turn, also does not penetrate up to the retina, but can damage the cornea, because of which the established laser safety limiting values are also substantially lower here than for the wavelength range according to the invention. This is true similarly for measurement radiation having a wavelength greater than 1400 nm, in particular the devices known from the prior art having a wavelength of 1550 nm. The established laser safety limiting values are also significantly below those for the wavelength range of 1200 nm-1400 nm here, i.e., the maximum permitted radiant power is substantially less for wavelengths greater than 1400 nm. As is apparent from FIG. 2, in surveying devices according to the invention having a wavelength between 1320 nm and 1400 nm, the transmittance is particularly low. The established limiting values are particularly high in this wavelength range, which advantageously enables particularly high radiant powers, for example, the mean power of the measurement radiation is optionally at least 40 mW, at least 90 mW, or at least 250 mW. The invention thus offers the advantage that measurement radiation can be emitted with substantially higher power than in devices according to the prior art, without special protective precautions having to be taken.

Figure 3A:
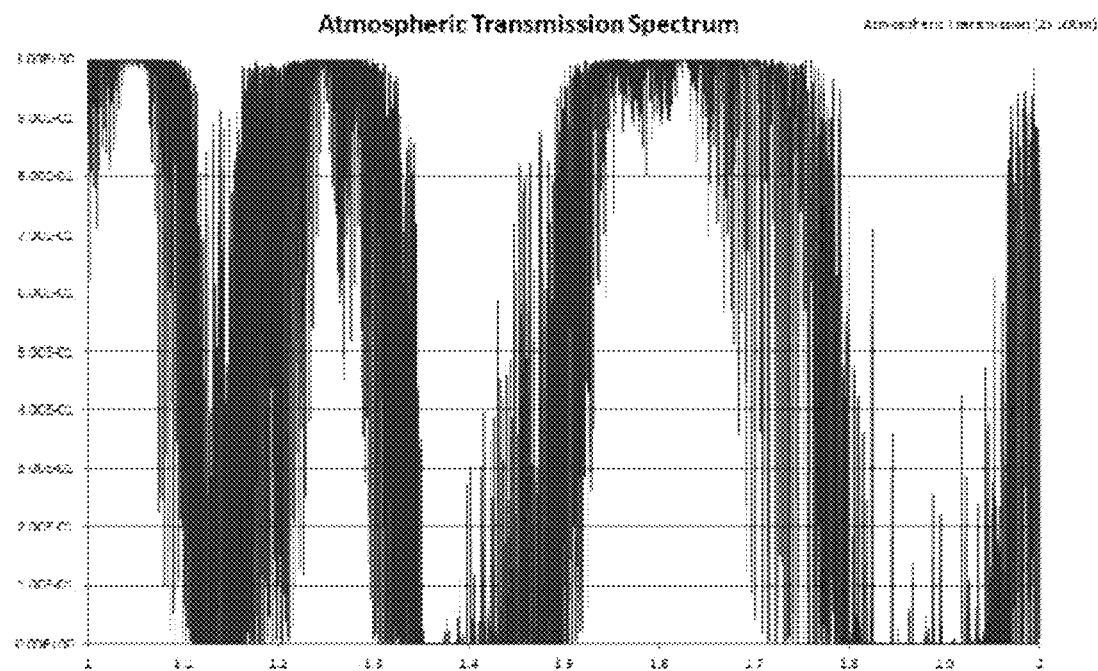
FIGS. 3a-d show the atmospheric transmission as a function of the wavelength for a defined measurement distance and the received measurement radiant power as a function of the measurement distance.

FIG. 3a shows the spectral transmissivity (transmittance) for a terrestrial atmosphere having natural moisture content as a function of the wavelength for a wavelength range of 1 μm to 2 μm, i.e., 1000 nm to 2000 nm, and a light path distance of 1000 m and/or a measurement distance of 500 m. Three spectral ranges having greater transmittance can be recognized, which are also referred to as transmission windows. The first wavelength range according to the invention is in the range of the 1.25 μm window (1170 nm-1320 nm) and therefore offers the advantage that the measurement radiation is attenuated hardly or relatively little by the atmosphere also at moderate or long distances. In other words, in this range, the atmospheric transmission coefficient is high or even almost 1. Since the measurement radiation is received by the device itself in surveying devices according to the invention, the measurement distance is twice the distance to the target, so that in particular at moderate and long measurement distances, i.e., for distances substantially greater than 100 m distance to the target, a high atmospheric transmission coefficient is particularly advantageous. The second wavelength range according to the invention comprises the range of 1320 nm to 1400 nm and covers the range having high absorption. This range is particularly suitable for short-distance applications less than 25 m, because the measurement radiation is not substantially reduced radiometrically at short distances as a result of the Beer-Lambert exponential law and additionally there is no interference due to sunlight. The global radiation hardly penetrates down to the earth at these wavelengths, the ambient brightness which generates shot noise is also negligibly small during the day.

Figure 3B:
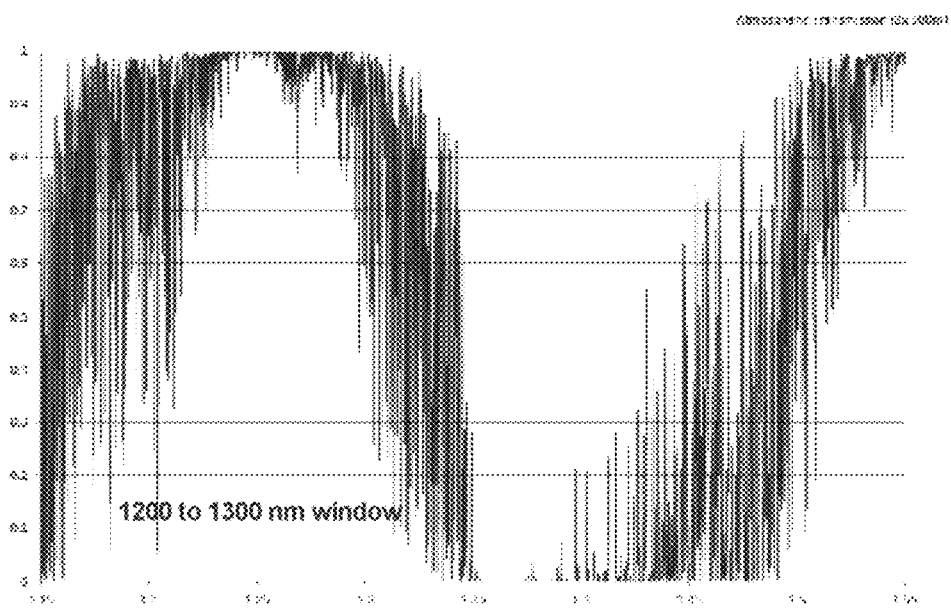

FIG. 3b shows the transmission for the wavelength range from 1.15 μm to 1.55 μm, i.e., 1150-1550 nm, for a long measurement distance of 1 km. In this case, the atmospheric transmission coefficient in the wavelength range from 1210-1310 nm is greater than 70% and is at least approximately maximal between approximately 1230 nm and 1280 nm, i.e., is approximately equal to 100%, because of which these wavelength ranges are particularly advantageous for moderate and long measurement distances. For this spectral range of 1210-1310 nm having high transmission, a surveying device according to the invention can be equipped with laser diodes from the telecommunications field. These telecommunications laser diodes emit at 1250 to 1350 nm, and are otherwise used for the 1.3 μm optical fiber networks having low mode dispersion.

Figure 3C:
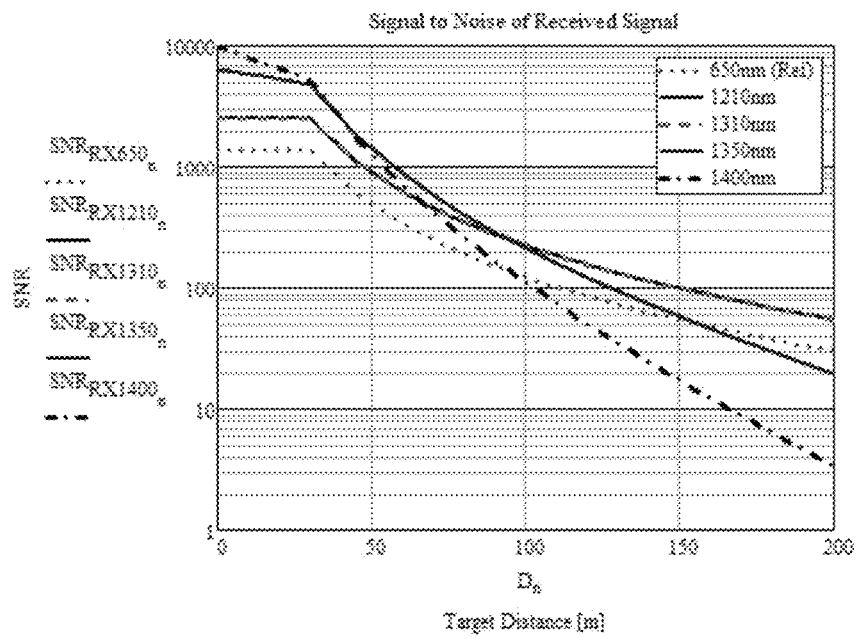

FIG. 3c further illustrates this advantage. The figure shows the signal-to-noise ratio (SNR) as a measure of quality for the reception signal, derived from the received measurement radiant power and the noise contribution of the reception solar ambient light, as a function of the distance to the target for the two wavelength ranges according to the invention of 1210-1310 nm and 1350-1400 nm. The wavelengths of 1210 nm (solid line) to 1310 nm (dashed line) are in the range of the atmospheric window having high transmission and are located one above the other. The SNR to be expected is a factor of 2 greater in this case than the SNR at the conventional wavelength of 650 nm. Wavelengths greater than 1320 nm, which are in the atmospheric absorption range, have a still higher SNR at short distances. For example, the wavelength at 1350 (light gray solid line) is advantageous over the reference wavelength 650 nm between 0 and 150 m and the wavelength 1400 nm (dot-dash line) has the best SNR at short range up to approximately 40 m. The power of the emitted measurement radiation is equal at all five wavelengths. As a result of the very high atmospheric transmission between 1210 nm and 1310 nm, the associated level of the reception signal is highest at these wavelengths. These wavelengths offer a substantial advantage at distances greater than 200 m and enable, in contrast to the other wavelengths, measurement ranges of well over 1 km up to more than 10 km, and not only at night, but rather also during the day, because the solar global radiation is practically negligible.

Figure 3D:
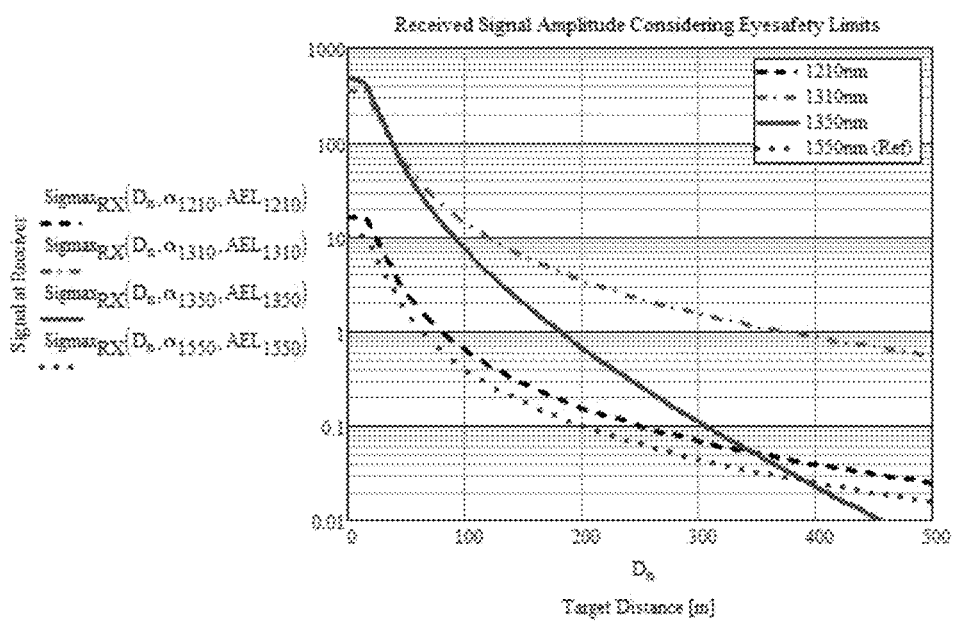

FIG. 3d shows, as a measure of the received measurement radiant power, the amplitude of the reception signal of the sensor as a function of the distance to the target for two wavelengths according to the invention of 1210 nm (dashed line) and 1310 nm (dot-dash line) in the atmospheric transmission window, a further wavelength according to the invention of 1350 nm (solid line) in the atmospheric absorption band, and as a comparison thereto, for the wavelength, which is known from fiber lasers and fiber amplifiers, of 1550 nm (solid line). In contrast to FIG. 3c, the graphs now each relate to a power of the emitted measurement radiation, which relates to the maximum permissible power according to the established limiting values for eye safety. At the known wavelength 1550 nm, this is more than one order of magnitude less than at the wavelengths according to the invention of 1310 nm and 1350 nm. The highest output power (500 mW) is provided at a wavelength of 1350 nm, while in contrast at a wavelength of 1300 nm, emission is performed at a power of approximately 200 mW. As a result of the higher output power, at a wavelength of 1350 nm, in spite of the higher atmospheric attenuation, a very high reception signal amplitude results at short distances to the target up to approximately 300 m. The use of a wavelength in the range of 1310 nm to 1400 nm therefore offers advantages for surveying devices and/or surveying for short distances. In comparison to surveying devices from the prior art, for example, having the illustrated wavelength of 1550 nm, this wavelength range also offers advantages for moderate measurement distances up to approximately 400 m, however. Vice versa, the wavelength range according to the invention between 1210 nm and 1310 nm is advantageous in particular for moderate to long measurement distances, because the atmospheric transmission coefficient is particularly high in this wavelength range, as described, so that a very high reception signal and/or a very high measurement radiant power can be received. As a result of the higher permissible output power, surveying devices using this wavelength or a wavelength in the range of 1280 nm and 1320 nm, however, also already offer advantages in the case of short measurement distances in comparison to the known wavelengths (for example, 1550 nm).

Figure 4:
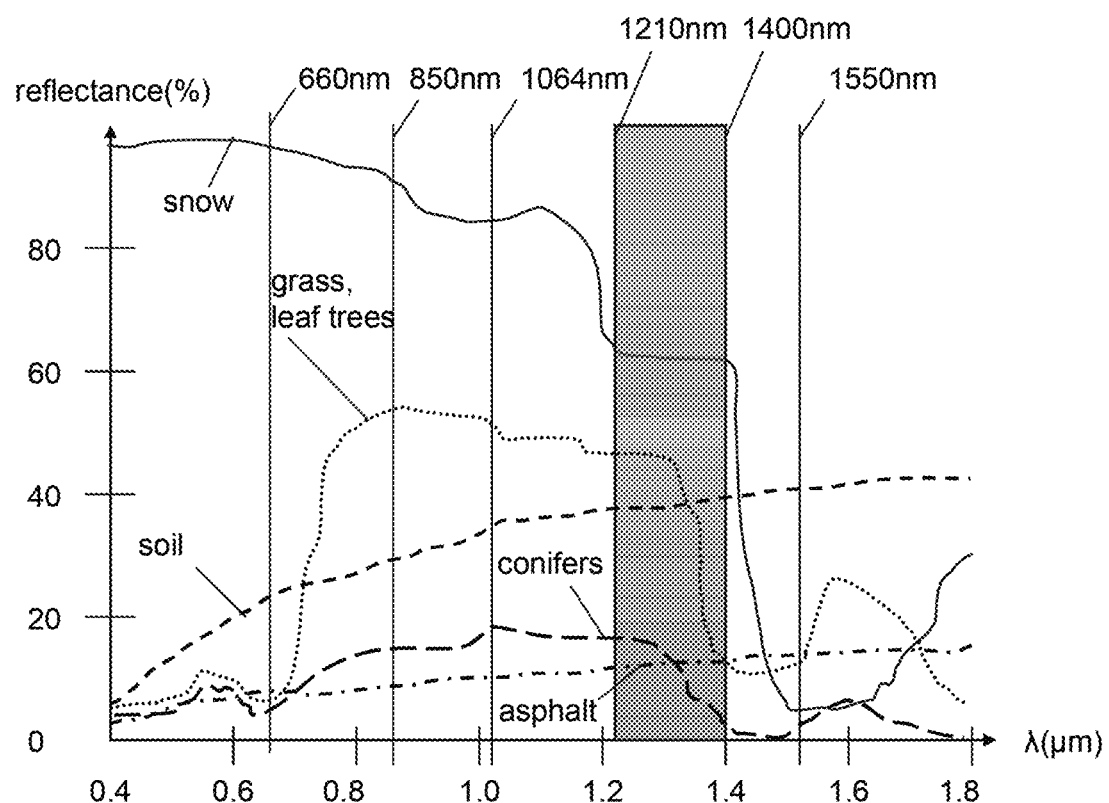
FIG. 4 shows the reflectivity of various materials as a function of the wavelength.

FIG. 4 illustrates the reflectivity of several natural materials and/or objects such as undergrowth as a function of the wavelength of the measurement radiation, specifically in the wavelength range from 400 nm to 1800 nm for snow (solid line), grass or leaf trees (dotted line), conifers (long-dashed line), dry soil (short-dashed line), and asphalt (line having dot-dashes). The graphs only represent approximate, rough values in this case, to illustrate the wavelength dependence of the reflection capability of various objects more qualitatively. In addition, four surveying wavelengths known from the prior art, 660 nm, 850 nm, 1064 nm, and 1550 nm are shown roughly by way of example, and the wavelength range between 1210 nm and 1400 nm is shown, as is used according to the invention. The reflectivity, which increases with the wavelength in the case of most materials, can be seen well. In particular, vegetation objects reflect particularly highly in the range between 1000 nm and 1400 nm. However, asphalt, concrete, and natural soils such as sandy soil or loam also have a reflection signature having increased reflectivity values. Measurement devices which measure such objects at wavelengths in the range of 1300 nm are advantageous with respect to signal strength. It can be seen that in particular the conventional wavelengths shorter than 900 nm have disadvantages with respect to the reflectivity and therefore the reflected power of the measurement radiation. With respect to materials such as asphalt or soil, the relatively short wavelengths of the visible range and the range adjoining thereon are disadvantageous, because the reflectivity of the surfaces observed here increases with the wavelength. The use of the wavelength 660 nm (or less) is disadvantageous in the case of surveying on plant-covered surfaces, because meadows and forests (both leaf and also conifer forests) only reflect very little light there. This also applies to wavelengths in the IR-B range, which includes the wavelength 1550 nm. This wavelength is likewise disadvantageous when surveying on snow-covered or ice-covered surfaces, because they only have a high reflectivity up to approximately 1400 nm, and then drop to very low values. The strength of the reflectivity has an effect in particular on the maximum achievable measurement range, because in the case of a low reflectivity, the measurement radiation is attenuated such that the received measurement radiation is no longer differentiable from noise from a specific measurement distance.

In contrast to surveying devices of the prior art, the present invention offers the advantage that in the case of all illustrated materials, a comparatively good reflection capability exists and therefore the measurement radiation is receivable with a relatively high component. With respect to soil and asphalt, it is advantageous that at wavelengths from 1210 nm, these materials have a relatively high reflectivity in comparison to shorter wavelengths. For example, at a wavelength of 1400 nm, a reflection capability which is approximately twice as high exists as at the wavelength of 660 nm. In comparison to the even longer wavelength of 1550 nm, the reflectivity is less, but this difference is only slight, in particular for wavelengths between 1320 nm and 1400 nm. Snow displays a very high reflectivity in the wavelength range according to the invention and the wavelength range between 1210 nm and 1400 nm is especially advantageous with respect to targets such as grass or leaf trees. This advantage applies in particular in comparison to the wavelength of 1550 nm, at which, as described, the reflection capability of snow and green plants is very low. The present invention thus offers the advantage that the wavelength of the measurement radiation used has good reflectivity in the case of a variety of materials and/or objects, whereby the reflected measurement radiation causes a comparatively high intensity, a high achievable measurement range, and a high measurement accuracy.

One embodiment of the surveying device according to the invention is equipped with an emitting unit for emission of a measurement radiation having one or more wavelengths between 1210 nm and 1310 nm. This device has the advantage of measuring with higher precision at long distances.

Especially the wavelength range at the longwave end of the atmospheric window described in FIG. 3b, at 1310 nm, is distinguished by high transmission, high reflectivity of the vegetation, soils, and rocky surfaces. In addition, the laser safety limiting values permit comparatively high eye-safe emission powers. As many objects as possible can thus be measured with high accuracy.

A further embodiment of the surveying device according to the invention is equipped with an emitting unit and/or radiation source having at least one wavelength between 1320 nm and 1400 nm. This device has the advantage that thanks to the comparatively high emission powers, as a result of the correspondingly designed laser safety limiting values and the low solar incident radiation, very precise optoelectronic measurements can be carried out for the distance or direction determination at short distances.

If multiple wavelengths are used, the surveying device according to the invention is expanded to form a hyperspectral analysis instrument. In the case of more than one measurement wavelength, materials and objects may be found, identified, and conclusions may be made about the status thereof, in particular the determination of the health status of vegetation. A hyperspectral or multispectral instrument would preferably cover the wavelength between 1170 nm and 1400 nm, wherein at least one of the wavelengths is in the range according to the invention of 1210 nm to 1400 nm.

Figure 5:
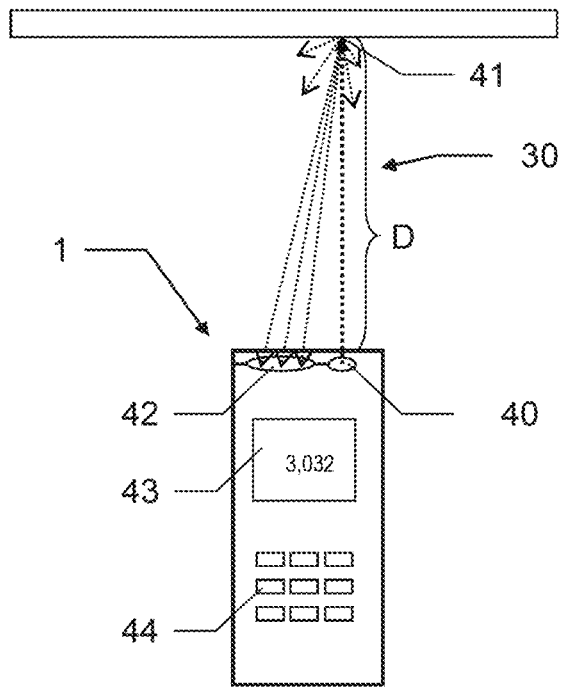
FIG. 5 shows an electronic distance meter as a first exemplary embodiment of a surveying device according to the invention, FIGS. 6a, b show a scanning unit as part of a second exemplary embodiment of a surveying device according to the invention, FIGS. 7a, b show a total station as a further exemplary embodiment of a surveying device according to the invention.

FIG. 5 shows an external view as an example of a surveying device 1 according to the invention in a handheld electronic distance meter for surveying distances. In particular in the field of construction installation or construction inspection, portable devices to be held in the hand are used, which are applied with respect to a structure to be surveyed and then carry out a distance measurement to a surface. Alternatively or additionally, a position measurement is performed, preferably in the form of a direction measurement in relation to the surface as the direction from the surveying device to the target 41 or the angle between the optical measurement axis and a zero axis of the surveying device. Typical handheld distance meters which are suitable for such applications are described, for example, in EP 0 738 899, WO 2015073548, and EP 0 701 702. The distance meter comprises a housing, in which the required electronic components are arranged. The housing is designed in this case so that the surveying device 1 can be held in the hand and also applied or attached in a defined manner to a target 41 to be surveyed. The surveying device 1 includes on its front side a laser radiation source 40 and a laser receiving unit 42, which have optical openings in the housing. A display device 43 in the form of a display screen and input means 44 in the form of a keypad are located on the upper side of the device. In addition, a camera (not shown here) can be provided for direction determination by means of recording images in the direction of the emission direction.

According to the invention, the laser radiation source emits measurement radiation 30 of at least one wavelength in the range between 1210 nm and 1400 nm having a power of at least 14 mW into free space toward a target 41, for example, on a wall, i.e., the measurement radiation 30 emitted in the direction toward the target 41 has a chronologically and spatially mean power of at least 14 mW. The wall has a naturally rough surface, from which optical beams are reflected in a scattered manner. A part of the scattered reflected measurement beams 30 is collected by the laser receiving unit 42, detected by a sensor (not shown) of the surveying device 1, and converted into an electrical signal. The signal is analyzed by an electronic circuit in a manner known per se to determine the digital value of the distance D to the target 41. As a result of the advantageous properties of the wavelength according to the invention and the comparatively high power of the emitted measurement radiation 30, in this case, the signal level is high in comparison to measurement devices of the prior art, which results in an advantageously high precision of the determined distance value and/or a long measurement range, i.e., also enables a distance determination to very remote targets 41, and also does so in particular with sunlit surfaces. Thanks to a good signal-to-noise ratio, high measurement speeds are also possible in the kilohertz and megahertz range, the objects can therefore be measured repeatedly or scanned using a repetitive measurement (tracking mode). For example, phase measurement or runtime measurement is used for distance ascertainment. The value, which is digitally determined by analysis, of the measured distance D—of 3.032 m here, for example—is then provided to a user on the display screen 43.

The surveying device according to the invention is optionally designed as a terrestrial or airborne laser scanner or laser profiler, which each detect the spatial position (2D or 3D coordinates) of a surface point, in that the distance to the targeted surface point is measured by the laser and this measurement is linked to the item or items of angle information of the laser emission. The spatial location of the detected point can be determined from these items of distance and angle information and the surface can be progressively surveyed, in that the laser beam is progressively pivoted. Presently, laser scanners, or the simpler form of the profiler, are also used on backpacks, handcarts (trolleys), motor vehicles (vehicle-based scanning, VBS), or unmanned aircraft (unmanned aerial vehicle, UAV) to survey objects three-dimensionally and depict them virtually as point clouds, for example.

Figure 6A:
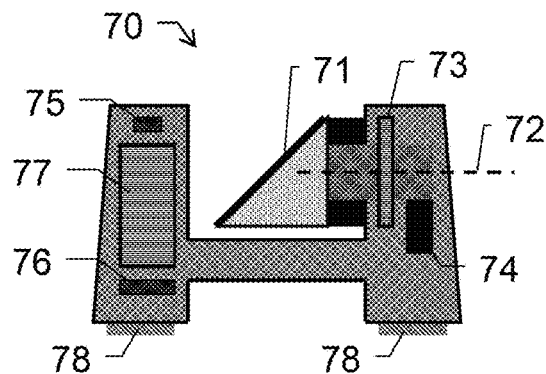

FIG. 6a shows the associated scanning module 70 as a detail of such a surveying device. This scanning module can be a component of a single-axis scanner (also called a profiler). However, the scanning module 70 can also be mounted via a fastening device 78 on a pivot device, for example, a base pivotable with a second axis of rotation. The scanner has a mirror 71 as a deflection element, which is rotatable about a first axis 72, wherein the rotation is caused by a motor 74 and a rotation angle can be detected using an angle measurement sensor 73. In addition, the module 70 is equipped with a radiation source 75, in particular a laser diode or a fiber laser, for emitting measurement radiation, and with a receiving unit for detecting reflected measurement radiation. The emitted measurement beam can be aligned via an optical beam guiding element 77 having optical means for guiding the measurement radiation onto the rotation mirror 71 (as a further optical means) and from there onto a measurement or target point.

As known from the prior art, the pivoting or rotation takes place in this case via an axis over 360° sufficiently rapidly (for example, typically between approximately 100,000 to 1,000,000 measurement points are detected per second) that the measurement radiant power can be considered to be distributed over this space. That is to say, the power which is emitted by the radiation source on the chronological average (i.e., in a period of time which is many orders of magnitude longer than the duration of a single pulse in the case of pulsed operation and/or the duration of the detection of a measurement point), is spatially "smeared" in the case of a surveying device designed as a scanner. Therefore, according to the invention, the radiant power emitted by the radiation source 75 in the case of such a surveying device having rapidly pivoted measurement beam 30 is consequently selected to be correspondingly higher in comparison to a surveying device having spatially resting (or only slowly pivoted) measurement beam 30, so that the accessible power of the emitted measurement radiation 30, in spite of the spatial distribution as a result of the pivoting of the measurement beam in space, is on average at least 14 mW and therefore, also in the case of a scanning, pivoting measurement, on the chronological and spatial average, a measurement radiant power which is emitted and therefore also receivable is provided which is high in comparison to the prior art. In other words, the power is always selected so that over the averaging period of time, in which the determination of the mean power was performed or would be performed using a power meter, at least a mean power of 14 mW is or would be measurable, independently of whether a spatially static or a pivoted measurement beam is provided.

The radiant power, which is incident during the scanning (i.e., measurement using rapid pivoting of the measurement radiation) on a 3.5 mm aperture of a power meter, which is arranged at 100 mm distance from the scanning vertex, can be used as a numeric example. The radiant power received by this aperture when the measurement laser beam passes over it is the component of the optical power emitted by the radiation source 75 which corresponds to the angle component of the full circle (360°, approximately 6.28 rd) (neglecting possible power losses along the optical path from the radiation source to the power meter). The aperture spans (without considering the negligible curvature) an angle of 3.5 mm/100 mm=0.035 rd. The angle component and therefore the power component is thus 0.035 rd/6.28 rd=5.57* $10^{-3}$. Therefore, the radiation source 75 of the laser scanner or laser profiler according to the invention emits an optical power of at least 14 mW/5.57*10$^{-3}$=2512 mW, i.e., at least 2.5 W, so that the spatially and chronologically averaged power of the emitted measurement radiation measured by the power meter is at least 14 mW (if the radiation source 75 is operated in pulsed operation, the 2.5 W are thus already to be understood as a chronologically average power of the radiation source, for example, averaged over a period of time of 0.1 seconds or 5 seconds, so that finally the minimum power of 14 mW represents a chronological and spatial average).

The scanning unit 70 is optionally equipped with a camera 76, the field of view of which is also guided via the optical beam guiding element 77 onto the mirror 71 and from there in the direction of the target.

Figure 6B:
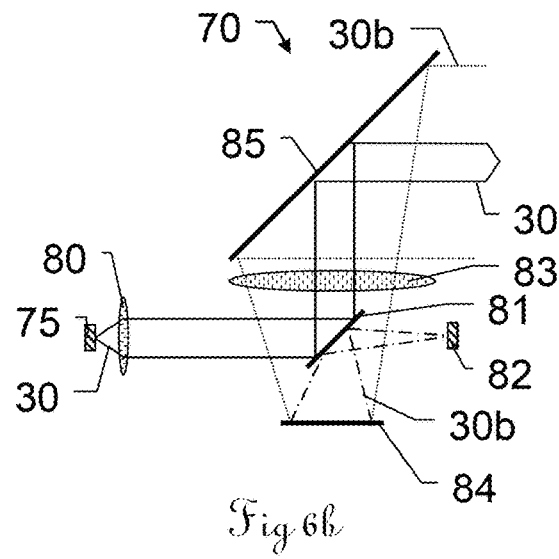

FIG. 6b shows a schematic detail of the scanning unit 70. The radiation source 75 emits a laser beam 30 as the measurement radiation, which is pre-focused by a collimating lens 80 as a first optical means and is incident slightly widened on a deflection mirror 81 as a further optical means. The laser beam 30 is reflected therefrom in the direction of the main objective lens 83 and is guided onto a second deflection mirror 85 as a further optical means and from there, for example, onto the beam deflection unit 71 (not shown here). The deflection mirror 85 can also be identical to the rotating mirror 71, however.

After the reflection of the beam 30 on the target object, in this special embodiment, the received beam 30b is guided by the rotatable beam deflection unit 71 and via the second deflection mirror 85 through the main objective lens 83 onto a further optical means, a mirror 84. The beam 30b is reflected therefrom on to the deflection mirror 81 and guided from there further onto the sensor 82. The mirror 84 folds the optical system so that the optical sensor unit 70 occupies the smallest possible volume.

Figure 7A:
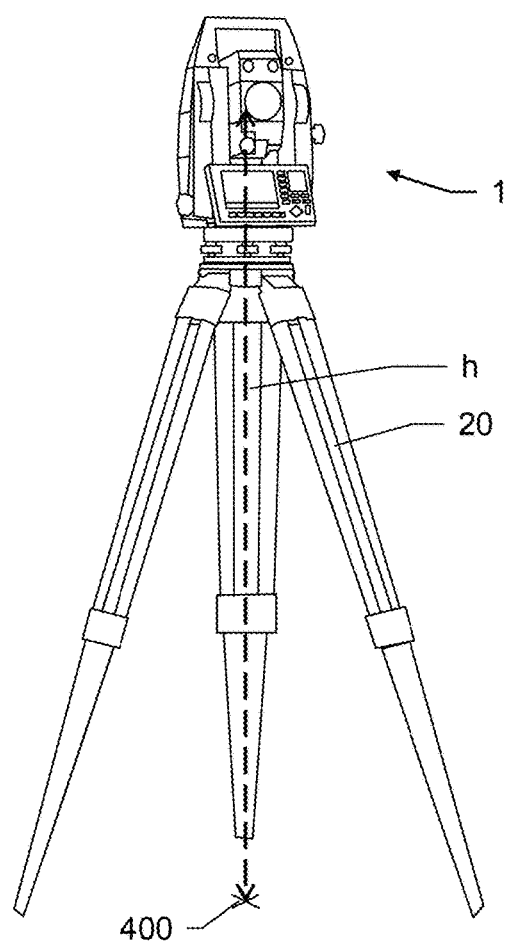
Figure 7B:
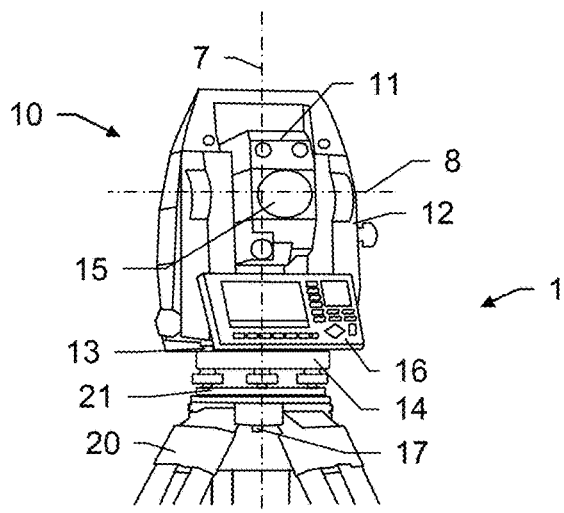

FIGS. 7a and 7b show a total station as an example of a geodetic surveying device 1 according to the invention. Such a geodetic surveying device of the prior art is described, for example, in EP 1686350. In this case, distance and position (direction and/or horizontal and vertical angles) from the surveying device, the absolute position of which is known, to the target to be surveyed are taken as the spatial standard data. The total station 1 has a stand 20 and—as shown in FIG. 7a—is arranged at a height h above a bottom point 400. The surveying device 1 typically stands on a three-legged stand 20 and is fixed by means of tripod 14 and stand screw 17 on the stand plate 21, centered in relation to the bottom point 400, and screwed in place.

As shown in FIG. 7b, a base 13 of the total station is connected via the tripod 14 directly and fixedly to the stand 20. The upper part 10 of the total station 1 is rotatable in relation to the base 13 about a vertical standing axis 7. The upper part 10 has in this case a support 12, formed in this exemplary structure by two columns, an aiming unit 11 mounted so it is rotatable between the columns about a horizontal tilt axis 8, for example, a telescope, and an electronic display control unit 16. The display control unit 16 can be designed in a known manner for the control of the total station and for the processing, display, and storage of measurement data.

The aiming unit 11 is arranged so it is rotatable on the support 12 about a horizontal tilt axis 8 and can therefore be pivoted and/or tilted horizontally and vertically in relation to the base 13 for the alignment on a target. Motors (not shown here) are provided to execute necessary pivot and tilt movements for the alignment of the aiming unit 11. The aiming unit 11 is optionally embodied as a shared aiming unit module, wherein a coaxial camera sensor and a graphics processor and, as optical means for beam guiding, the eyepiece 15, an objective lens, and a focusing optical unit can be integrated in a shared aiming unit housing. The optical means are optionally designed in this case such that the emitted measurement radiation and the detected reflected measurement radiation are guided at least partially via the same means, for example, a shared objective lens is used for both beam paths. By means of the aiming unit 11, the target can be targeted and the distance from the total station to the target can be detected in an electrosensory manner based on the detection of measurement radiation backscattered from the target. Furthermore, means are provided for the electrosensory detection of the angle alignment of the upper part 10 of the total station 1 in relation to the base 13 and the aiming unit 11 in relation to the support 12. These measurement data, which are detected in an electrosensory manner, are supplied to the display control unit 16 and processed thereby, so that the position of the target in relation to the total station is ascertainable, optically displayable, and storable by the display control unit 16. Such a total station can also be used as a laser scanner of objects. In this case, the highest possible point measurement rate of several tens of kilohertz up to megahertz is desired, to advantageously achieve a short recording or measuring time. A high measurement rate having high measurement quality at the same time is ensured by our light source having a radiation in the wavelength range according to the invention. The total station optionally comprises a scanning unit as described for FIGS. 6a and 6b. Such a scanning unit additionally has the advantage that a massive aiming unit 11 does not have to be moved rapidly, but rather merely a lightly constructed rotating mirror unit 71 (see FIG. 6a), which enables shorter scanning times during object recordings.

Figure 8A:
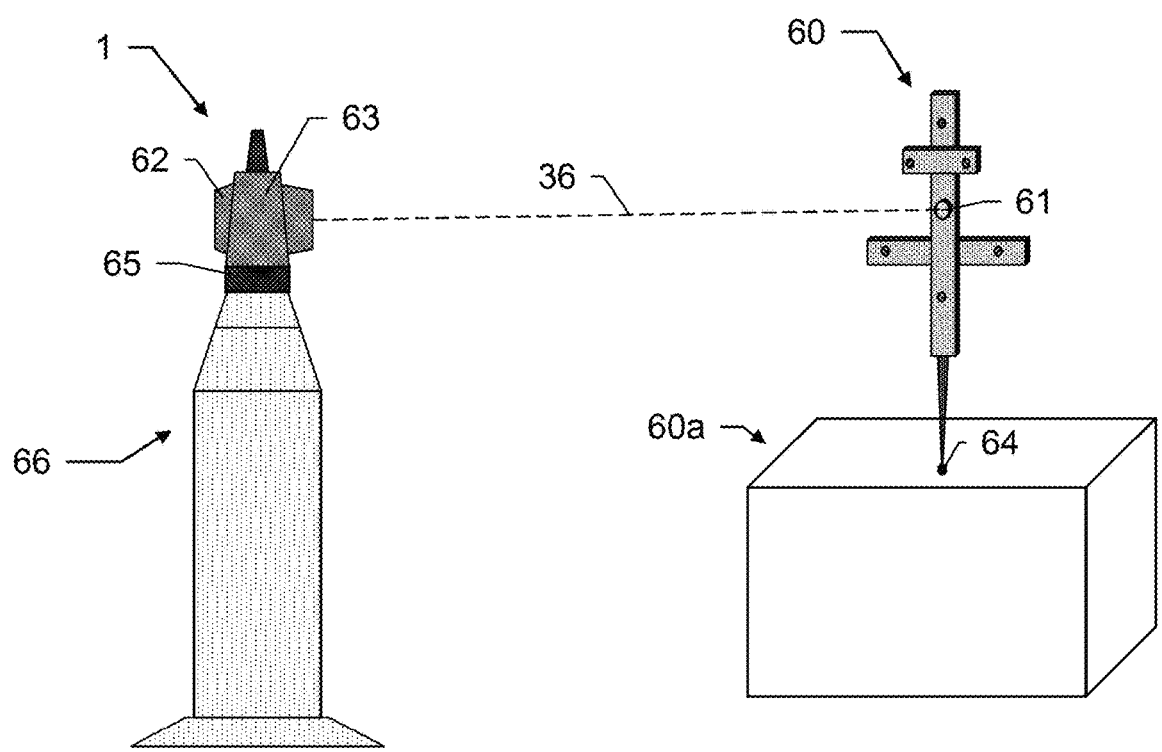
FIGS. 8a-c show a laser tracker as a further exemplary embodiment of a surveying device according to the invention.

FIG. 8a shows an exemplary embodiment of a surveying device 1 according to the invention as a laser tracker, i.e., a surveying device 1 having micrometer precision, which is designed for progressive tracking of a target and a position determination of a coordinate manner of this target. The laser tracker shown has a base 65, a support 63 attached thereon, and a beam deflection unit 62. The laser tracker is arranged on a stand 66, comprises at least one distance meter—in particular an absolute distance meter (ADM) and/or an interferometer (not shown here)—and measures, by means of at least one laser beam as measurement radiation, the distance to a retroreflector 61 located on a measuring aid 60 as the target. The measuring aid 60—embodied here by way of example as a measuring probe—comprises a measuring head 64 to be placed on a point to be surveyed of a target object 60a.

To be able to recognize and reproduce movements of the measuring aid 60, so that the laser beam 36 remains aligned on the retroreflector 61, the laser tracker has a position-sensitive detector (PSD), in particular a tracking surface sensor, as is disclosed, for example, in WO 2007/079600 A1.

The PSD is preferably arranged in the beam deflection unit 62 and enables the tracking of the alignment of the laser beam by detecting the alignment of the laser beam reflected from a target, in particular the retroreflector 61. Progressive target tracking (tracking) and/or fine targeting of the target 61 can be performed by the tracking of the laser beam alignment and the distance and position of the target 61 can be progressively determined in relation to the surveying device. During the target tracking, various causes can make the recognition of the target 61 and/or the fine targeting and/or tracking thereof more difficult or impossible and/or can restrict the maximum operative range. Such interfering causes are, above all, viewing conditions which influence the optical path, such as air turbulence close to window fronts, shimmering air above heating pipes, or airborne dust. All of these effects reduce the measurement signal and decrease the signal-to-noise ratio. However, these disadvantages can be more than compensated for by emitting units using the wavelengths according to the invention and a measurement accuracy in the micrometer range can be achieved.

Tracker-like robotic total stations, which also comprise progressive target tracking by means of camera or PSD sensor system, are also constructed for outdoor applications and enable longer target distances up to greater than 1 km. The disadvantageous influence of the optical path is pronounced above all in the case of robotic total stations. The optical signals for distance and direction measurement are attenuated by weather influences, such as rain, fog, or heat shimmers. Furthermore, external reflections are interfering, i.e., for example, light which is imaged on the position or image sensor in addition to the measurement radiation reflected by the target. Such external reflections are caused by external light or radiation sources such as direct or indirect, i.e., reflected from street signs or glass surfaces, solar radiation or headlights of construction vehicles. Interference is problematic in particular in the case of target tracking, because it frequently results in the loss of the lock-on (or engagement or coupling) on the target reflection, which makes a time-consuming renewed lock-on necessary. The present invention offers the advantage in this case that as a result of the wavelength used and the high emitted radiant power, the influence of external light is significantly reduced as described and as a result of the higher output power, weather influences can be at least partially compensated for, and this is true also in particular in the case of position determination thanks to the recognizability of the object shapes, which is improved due to higher emission power, in the camera images of the location sensor.

Figure 8B:
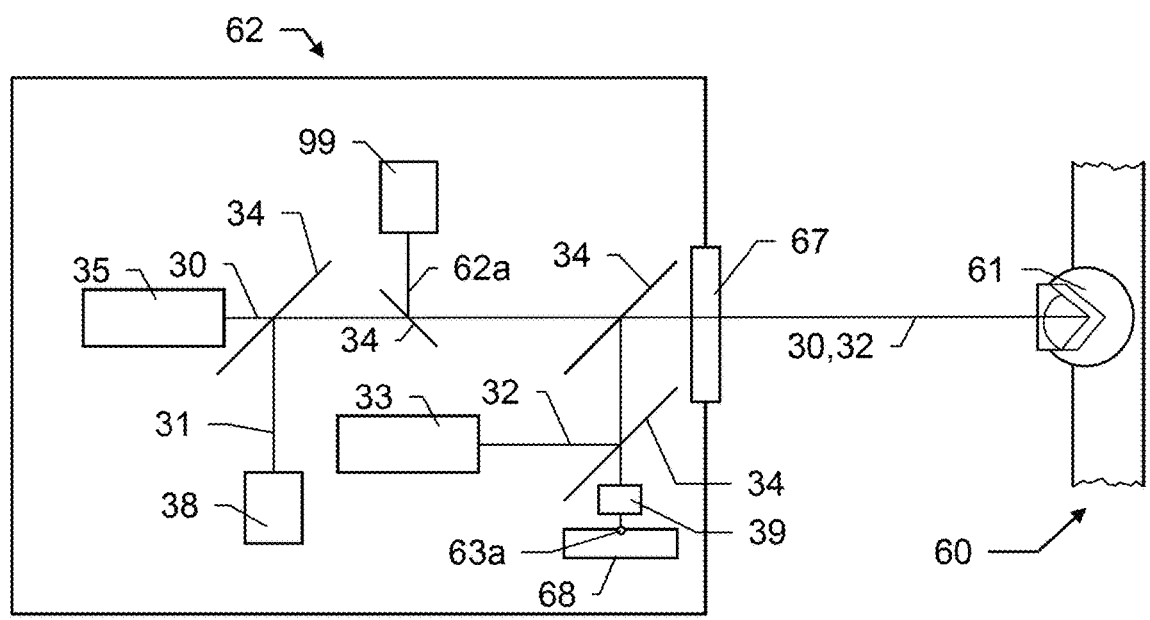

FIG. 8b schematically shows the beam deflection unit 62 from FIG. 8a. The beam deflection unit 62 comprises two radiation sources 33 and 35. The radiation source 33 emits measurement radiation (target tracking radiation 32), which is used in a known manner for tracking the target, the retroreflector 61 (tracking), while in contrast the measurement radiation 30 of the radiation source 35 is used for distance measurement. In this case, not only one but rather both measurement radiations 30 and 32 have a wavelength in the range according to the invention of 1210 nm to 1400 nm.

The beam deflection unit 62 has on its front side, which faces toward the measuring aid instrument 60, an entry and exit optical unit 67 for the emission of radiation along the measurement axis and for the intake of reflected radiation. The entry and exit optical unit 67 can be embodied in particular as a fixed focus objective lens having fixed focus and fixed zoom.

In addition to the first radiation source 35 for generating a measurement radiation 30, the beam deflection unit 62 of the surveying device comprises a sensor (distance measuring device) 38 for receiving the reflected measurement radiation 30 and for ascertaining a distance to a target, the retroreflector 61 here. The distance measuring device 38 is, for example, an absolute distance meter, but can also be an interferometer, or a combination of the two.

The beam deflection unit 62 additionally comprises the second radiation source 33 for generating a target tracking radiation 32 and a further sensor (target detection unit) 68 for receiving the reflected target tracking radiation 32, for determining a point of incidence 63a of the reflected radiation on the sensor, which is embodied in particular as a two-dimensional image sensor (pixel array sensor), of the target detection unit 68, and for generating an output signal to control a target tracking functionality of the laser tracker.

The optical axis of the first radiation source 35 preferably extends outside the laser tracker coaxially to the optical axis of the second radiation source 33 on a shared emission axis. This presumes that the two radiation sources 33, 35 have a shared exit optical unit 67. A shared entry and exit optical unit 67 of two beam paths means that the two beam paths exit through the same optical element, such as a lens or a pane, out of the device into the surroundings of the device or enter the device from the surroundings of the device. In this case, the beam paths are generally at least approximately coaxial.

In addition, the beam deflection unit 62 has a number of beam splitters 34, via which the measurement and target tracking radiations 30, 32 are emitted along the emission axis through the entry and exit optical unit 67 and via which the radiation reflected by the retroreflector 61 is conducted to the sensors 38 or 68, respectively.

The measurement radiation 30 and the target tracking radiation 32 differ in particular from one another with respect to the polarization and/or wavelength thereof such that, by way of a corresponding embodiment of a filter 39 positioned in front of the target detection unit 68, the reflected radiation intended for the distance measurement is filtered out and does not reach the sensor 68. Alternatively or additionally, the entirety of the reflected radiation 30, 32 can be separable into a component intended for the distance measurement and a component intended for the target tracking by a corresponding embodiment of the corresponding beam splitter 34.

The beam deflection unit 62 is aligned on the measuring aid instrument 60 so that the target tracking radiation 32 emitted by the second radiation source 33 is incident on the retroreflector 61 and the sensor (target detection unit) 68 detects the reflected target tracking radiation. By determining a point of incidence 63a of the reflected radiation on the surface of the sensor 68, an output signal is generated to control a fine targeting functionality and a target tracking functionality of the laser tracker.

To ascertain the distance to the measuring aid instrument and/or target 61, the first radiation source 35 generates a measurement radiation 30, which is emitted coaxially to the target tracking radiation 32 onto the retroreflector 61, where it is also coaxially retroreflected—as a result of the continuous target tracking. The reflected measurement radiation 30 is conducted via a beam splitter 34 onto the sensor (distance measurement device) 38, which ascertains a distance to the target (measuring aid instrument) 60 or more precisely the retroreflector 61. At the same time, via the angle measurement functionality of the laser tracker, the present alignment of the beam deflection unit 62 and therefore the direction to the measuring aid instrument 60 are ascertained. A relative position of the measuring aid instrument 60 in relation to the surveying device 1 can be determined from direction and distance. By means of the wavelengths according to the invention in the range of 1210 nm to 1400 nm, the at least two light sources can be improved such that a laser tracker or a robotic total station, thanks to increased emission power and/or simultaneously reduced solar ambient light, has improved 3D position measurements with short robust distances and at long distances. In addition, 3D position measurements are possible with substantially higher measurement rates of multiple tens of kilohertz up to megahertz in relation to the prior art.

An optional pointer unit having a pointer radiation source 99 for generating a visible pointer beam 62a is also shown, which can be emitted via a pointer beam splitter 34 substantially coaxially to the measurement radiation 30 and to the target tracking radiation 32 through the entry and exit optical unit 67. The pointer beam 62a generates in this case a visible (for example, red) point of incidence and is used for information for the user. This is advantageous in the present invention, because the measurement radiations 30 and 32 are embodied as invisible to the human eye and therefore the point of incidence thereof on a surface is not visible to the user.

Figure 8C:
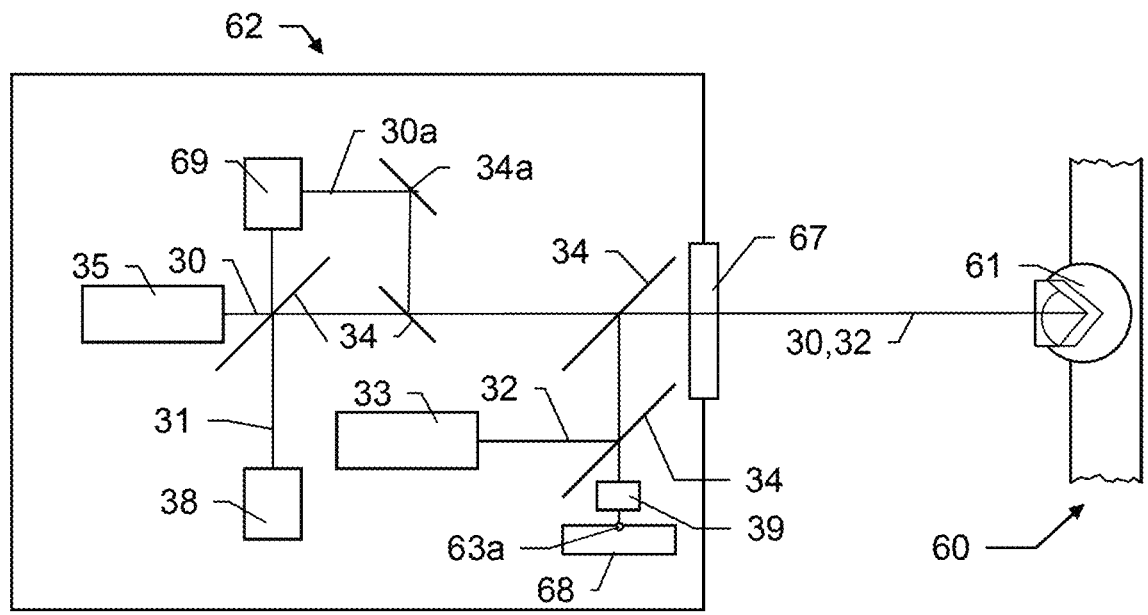

FIG. 8c shows an alternative refinement of the invention, in which, instead of the pointer radiation source of FIG. 8b, the beam deflection unit comprises an optical frequency converter 69, with the aid of which the frequency of a component of the measurement radiation 30 (or target tracking radiation 32) is changed so that radiation is emitted in the visible range. For this purpose, by means of a beam splitter 34, a component, for example, 2.5%, 10%, or 25%, of the measurement radiation 30 of the first wavelength is decoupled and guided to the frequency converter 69, which generates radiation 30a, which converts this component of the measurement radiation into radiation of a second wavelength. The frequency converter 69 is preferably a frequency doubler, so that the second wavelength is half as long as the first wavelength. Depending on the value of the first wavelength, a wavelength then results between 605 nm and 700 nm, wherein the first wavelength and the frequency converter 69 are preferably adapted to one another such that the second wavelength is in the range between 645 nm and 680 nm. The converted radiation 30a is guided by means of the optical means 34a and 34 back to the emission axis, so that the converted radiation 30a can be emitted substantially coaxially to the measurement radiation 30 and to the target tracking radiation 32 through the entry and exit optical unit 67. The radiation 30a is then used as a pointer beam for generating a visible (for example, red) point of incidence and for information for the user. The wavelength range according to the invention between 1210 nm and 1400 nm is advantageously particularly well suitable for frequency doubling, to thus generate visible light, whereby as described, for example, a separate radiation source for a pointer beam can advantageously be omitted. Such a refinement is not restricted to a surveying device designed as a laser tracker, but rather is also suitable, for example, for an electronic distance meter as described in FIG. 5, since the generation of a visible point of incidence is also advantageous in this case.

The present invention offers a further advantage in this case: the optical means used in surveying devices having a wavelength in the visual range of the spectrum, for example, lenses, for example, of the entry and exit optical unit 67, beam splitters 34, or the deflection mirrors and lenses shown in FIG. 6b are usually manufactured from silicate glasses. These are distinguished by a high transmittance, a high resistance, and low costs. The transmittance also exists for wavelengths up to 1400 nm, i.e., for the IR-A range (according to DIN 5031). For example, borosilicate glass N-BK7 has a high transparency in the wavelength range of 400 nm to 1400 nm (but not beyond this). Therefore, the present invention not only offers the advantage that the same optical means are usable without problems for the beam guiding of the measurement radiation of the wavelength range according to the invention between 1210 nm and 1400 nm and a pointer radiation according to FIG. 8c having the converted radiation or also 8b having a separate pointer radiation source. The present invention additionally offers the advantage that standardized, routine optical means can be used for the optical radiation guiding. Advantages thus result in the manufacturing of the surveying device, which results in time and cost savings. In contrast, for a surveying device in which a wavelength in the IR-B range is used, in particular surveying devices known from the prior art using wavelengths>2000 nm, special glasses are required for the optical means, which disadvantageously results in an increased manufacturing expenditure.

When surveying with cooperative targets such as the retroreflectors shown in FIGS. 8a-8c, it is furthermore disadvantageous that these must also be specially manufactured using comparatively costly glasses, which further increases the costs of a system made of surveying device 1 and target object 61. In contrast, the present invention offers the advantage that surveying targets 61 are usable, which are already used when surveying in the visual spectral range.

A further advantage of the present invention, especially with respect to retroreflectors 61, results from the following: cooperative surveying targets known from the prior art are, for example, the retroreflectors 61 of FIGS. 8a-8c. To increase the reflection capability, some reflectors are provided with a reflection capability. For example, reflectors of the producer Leica Geosystems have a copper layer as a reflective coating.

Figure 9:
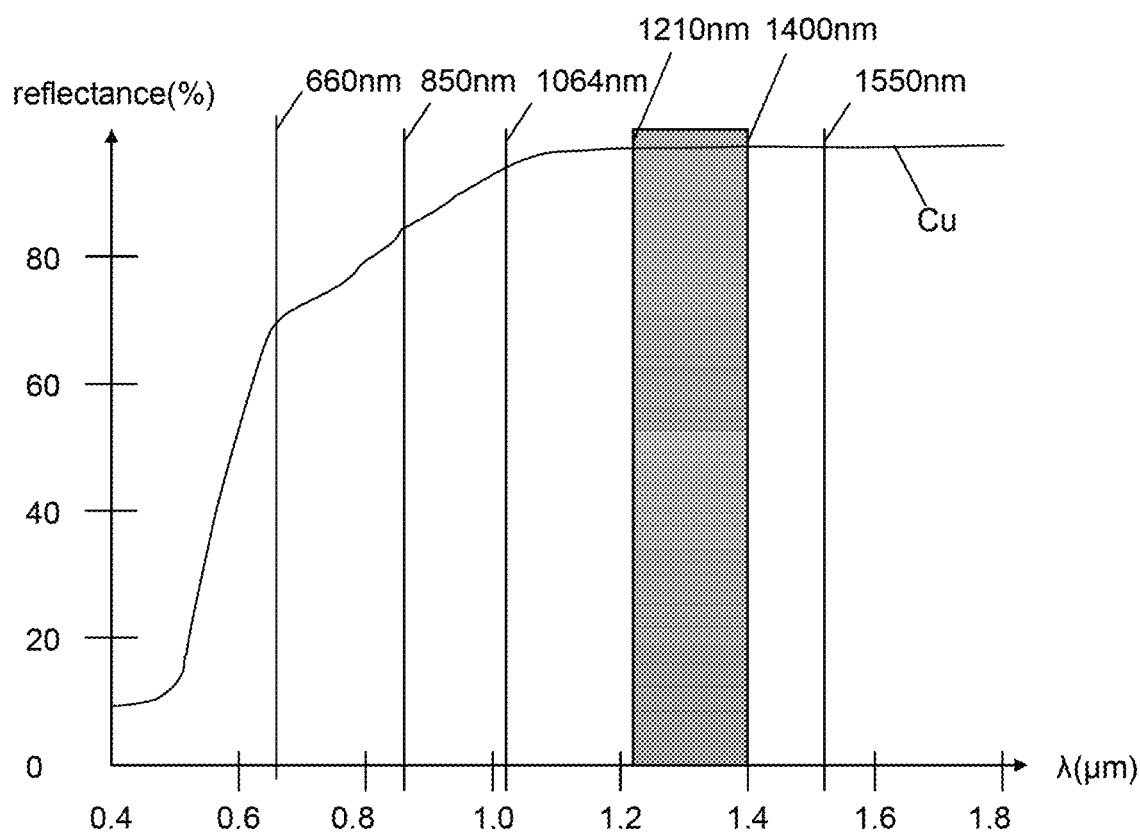
FIG. 9 shows the reflectivity of a copper coating as a function of the wavelength.

As shown in FIG. 9, the reflection capability of copper (and other noble or semi-noble metals) continuously increases in the optical spectral range with increasing wavelength (the graph only shows approximate, rough, rather qualitative values in this case). Below a wavelength of approximately 590 nm, the reflection capability of a copper coating known from the prior art is less than 50%, at a wavelength of 660 nm it is only approximately 70%, while in contrast the reflection capability at the wavelength according to the present invention at least approximately reaches the maximum possible value at greater than 90%. The present invention thus offers the advantage that in comparison to surveying devices of the prior art, significantly more measurement radiation is reflected from a cooperative target known from the prior art having a copper coating. In other words, radiation losses are reduced by the present invention, whereby, with unchanged power of the emitted measurement radiation, the power of the detected measurement radiation is increased and/or a lower output power is necessary while or for achieving the same detected radiation.

Figure 10:
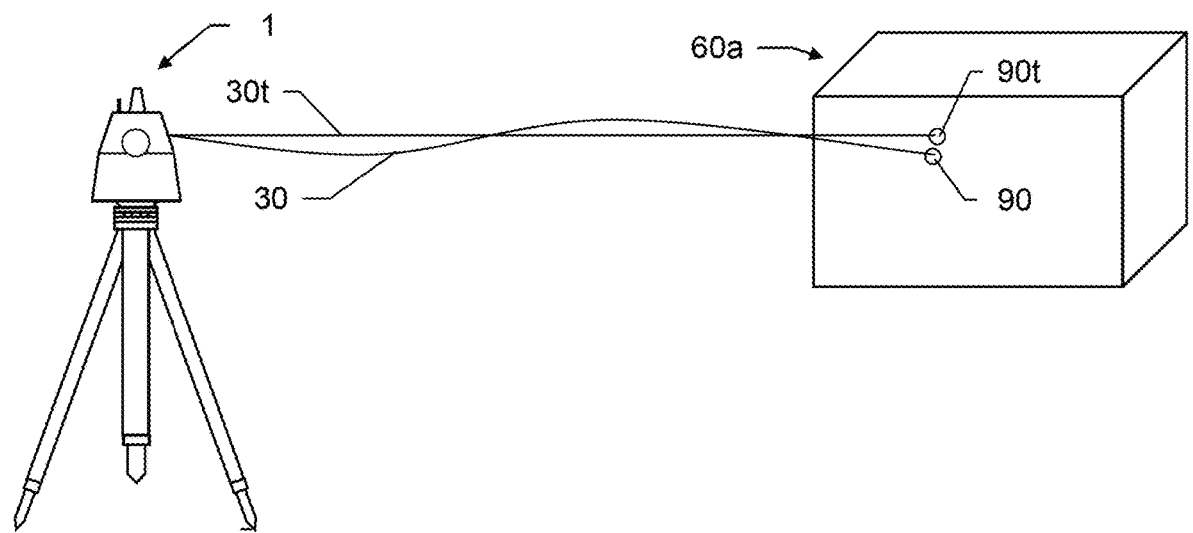
FIG. 10 shows a schematic illustration of a deviation of the measurement beam point of incidence.

A comparatively long wavelength in the range of 1210 nm to 1400 nm is furthermore advantageous for atmospheric influences (turbulence), which have the result that the measurement beam deviates from its original propagation direction and therefore the actual point of incidence on the target is not the measured one, whereby measurement inaccuracies result. This is schematically shown in FIG. 10. The surveying device 1 emits the measurement radiation 30, the propagation of which is not absolutely linear as a result of the air influences (in comparison thereto the "theoretical" absolutely linear light beam 30t). The actual point of incidence 90 of the measurement beam on the target 60a therefore does not correspond to the expected and/or assumed point of incidence, but rather deviates therefrom, which results in measurement errors, which are larger the greater the distance is to the target object 70. This deviation can be described by the radial variance $\sigma^2$, which can in turn be described by the following equation:

$$\sigma^2 = c^2 \lambda^{-1/6} D^{17/6}$$

wherein c is a measure of the atmospheric turbulence, $\lambda$ is the wavelength of the measurement radiation, and D is the distance to the target. It is apparent from the equation that the radial variance and therefore the deviation is less the longer the wavelength is, whereby the wavelength range according to the invention is advantageous, for example, over wavelengths of the visible range of the spectrum, in particular in the case of surveying with long measurement distances and strongly turbulent atmosphere. With increasing wavelength, the light loss due to scattering on aerosols, which also becomes exponentially larger with the measurement distance, is also reduced. These floating particles scatter a part of the measurement radiation and do so more weakly the longer the wavelength. A long wavelength in comparison to the visible spectrum is therefore attenuated substantially less.

In an optional refinement of the surveying device according to the invention, it comprises means which enable a measurement of distances based on a frequency comb or assisted by a frequency comb. For this purpose, the corresponding distance meter has a radiation source of the wavelength range according to the invention, which is embodied for emitting a femtosecond laser, which is typically pulsed in the megahertz range and is timed with high precision. A so-called frequency comb of thin sharp lines can thus be generated in the frequency range, which corresponds in the time range to the lowest possible phase noise. Various approaches for frequency comb-based or frequency comb-assisted measurement of distances are described, for example, in the article "Frequency-Comb Based Approaches to Precision Ranging Laser Radar" (N. R. Newbury, T.-A. Liu, I. Coddington, F. Giorgetta, E. Baumann, W. C. Swann; National Institute of Standards and Technology).

Figure 11:
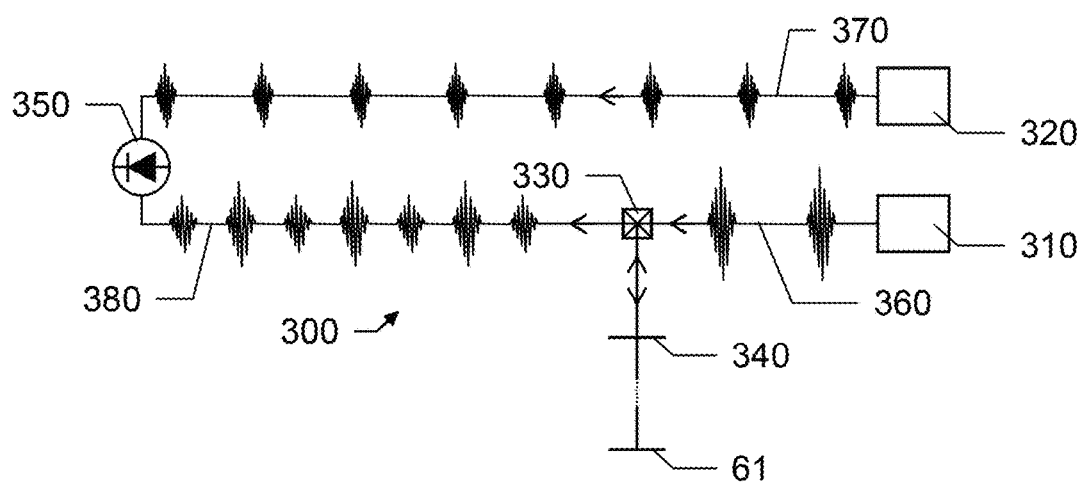
FIG. 11 shows a schematic example of an interferometer unit for a frequency-comb-assisted measurement.

FIG. 11 shows, solely by way of example, an interferometer unit 300 having two frequency comb laser signals 360, 370 ("dual-comb interferometer") for carrying out a combined runtime and interferometric distance measurement. In this case, a first radiation source 310 emits a first frequency comb signal 360. This is conducted via a first beam splitter 330 and via a reference beam splitter 340 to a retroreflector as the measurement target 61. The combined signal 380 reflected by the measurement target 61 and reference 360 is conducted to a frequency comb analysis unit 350, where the relative arrival time of the pulses reflected by measurement target 61 and reference 360 can be used for a runtime distance measurement. A reference frequency comb signal 370 generated by a second radiation source 320, which has a repetition rate slightly deviating from the first frequency comb signal 360, can be read out in a heterodyne manner in the frequency comb analysis unit 350 together with the reflected combined signal 380 for an interferometric distance measurement. These frequency comb or comb laser measurement methods fundamentally also function on non-cooperative targets such as rough surfaces, because the polarization of the reflected light is partially maintained.

As an alternative to the measurement of cooperative and also non-cooperative targets, the measurement of a distance is performed by means of the waveform digitization principle (WFD). The distance is measured by means of a waveform digitizing module provided in the beam deflection unit 62 (cf. FIG. 8*a*). This method is distinguished by its very high sensitivity and also enables precise distance measurements without the use of a measurement aid or a retroreflector. The WFD module comprises a radiation source for generating a pulsed light beam, in particular a laser beam (WFD beam) at the wavelength according to the invention in the range between 1210 nm and 1400 nm. In the known manner, which is referred to as waveform digitizing, the pulses of the backscattered measurement radiation and optionally that of a device-internal reference beam are digitized. The target and reference pulses thus digitized are compared to one another, in particular the time interval between them, and the distance to the target object is thus ascertained by a computer unit. The WFD beam comprises at least one sampled light pulse (WFD pulse) which is modulated or coded so that the component thereof returning from the target object is provided for being analyzed according to the waveform digitization method (WFD method)—with chronological sampling of the one or more returning pulses (i.e., can be sampled and analyzed according to the WFD method). The waveform digitizing (WFD) distance measurement principle is based either on the runtime or the phase measurement principle or also a combination of both methods. The possibility is advantageous in particular in this case of surveying distances over greater distances using the WFD radiation than using a conventional precision absolute distance meter or an interferometer. This surveying method is advantageously applied in a surveying device according to the invention having greater measurement range, which is achievable particularly well as a result of the wavelength according to the invention of the measurement radiation and the power thereof.

Alternatively, the surveying device comprises an FMCW module (frequency modulated continuous wave), which comprises a radiation source embodied to emit frequency-modulated measurement radiation using the wavelength according to the invention in the range between 1210 nm and 1400 nm, whereby a distance measurement by means of an FMCW method is enabled. In particular, the FMCW module can comprise a coherent laser radar, as described, for example, in EP 1 869 397 B1. The approach used in this optional embodiment for distance measurement to a diffusely scattering surface of a target object consists of emitting frequency-modulated electromagnetic radiation, for example, light, onto the target to be surveyed and subsequently receiving one or more echoes of backscattering objects, ideally exclusively from the target to be surveyed. After the reception, the possibly superimposed echo signal is superimposed with a mixed signal and the frequency of the signal to be analyzed is thus reduced, so that only a low amount of effort is required by the device. The mixing can be performed in this case either as a homodyne method using the emitted signal or as a heterodyne method using a periodic, in particular harmonic, signal of known period. The methods therefore differ in that mixing is performed using the emitted signal itself or using a harmonic signal having a separate frequency. The mixing is used to transform the reception signal into lower frequencies. Subsequently, the run times and therefore—with known propagation speed of the radiation used—the distances to the targets to be surveyed are determined from the resulting signal.

The devices used for implementing these methods typically use a signal generator as a chirp generator, which applies a signal to a radiation source which can be modulated. Emitting and receiving optical units are used for the emission and for the reception, to which a detector or receiver having downstream mixer, A/D converter, and digital signal processor and/or FPGA is connected downstream. The run times are determined from the frequency information and possibly the phase information of this signal. A WFD module or FMCW module of a surveying device according to the invention is optionally embodied as frequency-comb-assisted.

It is obvious that these illustrated figures only schematically illustrate possible exemplary embodiments. The various approaches can also be combined according to the invention with one another and with surveying devices and surveying methods of the prior art.

What is claimed is:

1. An optoelectronic surveying device for distance and/or position determination, comprising:
    a radiation source for generating optical measurement radiation of a first wavelength,
    an optoelectronic sensor for the time-resolved and/or location-resolved detection of measurement radiation,
    optical means which are designed for optical beam guiding such that:
        the measurement radiation can be emitted in an oriented manner into free space toward a target to be surveyed, and
        measurement radiation reflected by the target is guided at least partially onto the sensor,
    wherein the radiation source is configured such that the first wavelength is in the near infrared range between 1210 nm and 1300 nm or 1320 nm and 1400 nm and the power of the emitted measurement radiation is at least 14 mW in the chronological and spatial average independently of whether a spatially static or a pivoted and continuous wave or pulsed measurement beam is provided,
    wherein the surveying device comprises an optical frequency converter, wherein a component of at most 25% of the measurement radiation is convertible into a second wavelength, which is shorter so that additional radiation of the second wavelength can be emitted, wherein the second wavelength is in the red spectral range between 645 nm and 680 nm,
    wherein the radiation source is configured to modulate the measurement radiation by a modulation selected from the group consisting of:
    pulse modulation,
    interval modulation,
    double pulse interval modulation,
    amplitude modulation,
    frequency modulation,
    burst modulation,
    polarization modulation, or
    wavelength modulation.

2. The surveying device according to claim 1, wherein the first wavelength is between 1280 nm and 1300 nm.

3. The surveying device according to claim 1, wherein the first wavelength is between 1290 nm and 1300 nm.

4. The surveying device according to claim 1, wherein the first wavelength is between 1320 nm and 1400 nm.

5. The surveying device according to claim 1, wherein the first wavelength is between 1325 nm and 1345 nm.

6. The surveying device according to claim 1, wherein the measurement radiation is emitted at the mean power of at least 40 mW.

7. The surveying device according to claim 1, wherein the measurement radiation is emitted at the mean power of at least 100 mW.

8. The surveying device according to claim 1, wherein the radiation source is designed to generate measurement radiation having a burst modulation or frequency modulation.

9. The surveying device according to claim 1, wherein the radiation source is designed as a laser source, or as an InGaAs laser diode, or as a InGaAsP laser diode, or as a fiber laser, or a super-luminescent LED having optical amplifier.

10. The surveying device according to claim 1, wherein the optical means are designed such that the measurement radiation is emitted as a divergent measurement beam.

11. The surveying device according to claim 1, wherein the optical means are designed such that the measurement radiation is pivotable about at least one axis.

12. The surveying device according to claim 1, wherein the optical means are designed such that the surveying device comprises a shared objective lens for emitting the measurement radiation and for receiving measurement radiation reflected by the target.

13. The surveying device according to claim 1, wherein the optical means are designed such that the optical means are also substantially transmissive for light in the visible range of the optical spectrum.

14. The surveying device according to claim 1, wherein
    the sensor is designed for measurement accuracies of coordinates in the submillimeter and/or times in the subpicosecond range, and/or
    the surveying device comprises an upper part pivotable about a base, wherein the upper part comprises the radiation source, and/or
    the surveying device is designed for surveying natural, noncooperative targets and surfaces.

15. The surveying device according to claim 1, wherein the surveying device is designed as
    a handheld laser distance meter, or
    an airborne laser scanner or laser profiler, or
    a terrestrial laser scanner or laser profiler of moderate or long range, or
    a laser total station.

16. The surveying device according to claim 1, wherein the surveying device comprises
    a waveform digitizing module or a frequency-modulated continuous wave module, and/or an optical mixer, which is designed to carry out a homodyne or heterodyne mixing method.

17. An optoelectronic measurement method for an optoelectronic surveying device for determining at least one distance and/or position of a target comprising:
    emitting the measurement radiation of a first wavelength toward a target to be surveyed, wherein the measurement radiation is modulated by means of a modulation selected from the group consisting of: pulse modulation, interval modulation, double pulse interval modulation, amplitude modulation, frequency modulation, burst modulation, polarization modulation, and wavelength modulation,
    converting at most 25% of the measurement radiation into a second wavelength which is shorter than the first wavelength;
    emitting the measurement radiation with the second wavelength so that additional radiation of the second wavelength can be emitted,
    receiving at least a part of the measurement radiation reflected by the target, and
    determining the distance and/or position by means of the received measurement radiation,
    wherein the measurement radiation is emitted having:
        the first wavelength in the near infrared range between 1210 nm and 1300 nm or 1320 nm and 1400 nm, and
        a power of, in the chronological and spatial average, at least 14 mW independently of whether a spatially static or a pivoted and continuous wave or pulsed measurement beam is provided; and the second wavelength having a red spectral range between 645 nm and 680.

18. The measurement method according to claim 17, wherein the determination of the distance is performed according to the waveform digitizing method, the phase difference method, the threshold value method, or the Fizeau method, and/or the determination of the position is performed according to focal point analysis, correlation analysis, or maximum likelihood estimation methods.

19. The measurement method according to claim 17, wherein the measurement radiation comprises at least two wavelengths and a signal amplitude of the received measurement radiation is determined for each wavelength.

20. A non-transitory computer program product, which is stored on a machine-readable carrier having program code for controlling and/or carrying out the method according to claim 17.

21. An optoelectronic surveying device for distance and/or position determination, comprising:

a radiation source for generating optical measurement radiation of a first wavelength, an optoelectronic sensor for the time-resolved and/or location-resolved detection of measurement radiation, optical means which are designed for optical beam guiding such that:

the measurement radiation can be emitted in an oriented manner into free space toward a target to be surveyed, and measurement radiation reflected by the target is guided at least partially onto the sensor, wherein the radiation source is configured such that the first wavelength is in the near infrared range between 1210 nm and 1300 nm or 1320 nm and 1400 nm and the power of the emitted measurement radiation is at least 14 mW in the chronological and spatial average independently of whether a spatially static or a pivoted and continuous wave or pulsed measurement beam is provided, wherein the surveying device comprises an optical frequency converter, wherein a component of at most 25% of the measurement radiation is convertible into a second wavelength, which is shorter so that additional radiation of the second wavelength can be emitted, wherein the second wavelength is in the red spectral range between 645 nm and 680 nm.

* * * * *